US011085874B2

(12) United States Patent
Pourkazemi et al.

(10) Patent No.: US 11,085,874 B2
(45) Date of Patent: Aug. 10, 2021

(54) CHARACTERIZATION OF MULTILAYER STRUCTURES

(71) Applicant: VRIJE UNIVERSITEIT BRUSSEL, Brussels (BE)

(72) Inventors: Ali Pourkazemi, Vilvoorde (BE); Johan Stiens, Bonheiden (BE)

(73) Assignee: VRIJE UNIVERSITEIT BRUSSEL, Brussels (BE)

( * ) Notice: Subject to any disclaimer, the term of this patent is extended or adjusted under 35 U.S.C. 154(b) by 0 days.

(21) Appl. No.: 16/854,680

(22) Filed: Apr. 21, 2020

(65) Prior Publication Data
US 2020/0249153 A1 Aug. 6, 2020

Related U.S. Application Data

(63) Continuation-in-part of application No. 15/737,417, filed as application No. PCT/EP2016/064208 on Jun. 20, 2016, now abandoned.

(30) Foreign Application Priority Data

Jun. 19, 2015 (EP) ..................... 15173035

(51) Int. Cl.
*G01N 21/3563* (2014.01)
*G01N 21/88* (2006.01)
(Continued)

(52) U.S. Cl.
CPC ......... *G01N 21/3563* (2013.01); *G01B 11/06* (2013.01); *G01B 15/02* (2013.01); *G01N 21/88* (2013.01); *G01N 22/00* (2013.01)

(58) Field of Classification Search
CPC .... G01N 21/55; G01N 21/3581; G01N 22/00; G01N 2021/8438
See application file for complete search history.

(56) References Cited

U.S. PATENT DOCUMENTS 9,797,854 B1    10/2017 Silva
10,801,954 B2 *  10/2020 Ochiai ................... G01B 15/02
(Continued)

FOREIGN PATENT DOCUMENTS

WO    2014153263 A1    9/2014

OTHER PUBLICATIONS

Cook et al., "Accuracy and Linearity of Time-Domain THz Paint Thickness Measurements," Proc. of SPIE, vol. 6893, 2008, 10 Pages, available at least as early as Dec. 31, 2008.
(Continued)

*Primary Examiner* — Christine S. Kim
(74) *Attorney, Agent, or Firm* — Workman Nydegger

(57) ABSTRACT

A method for determining characteristics of a structure is disclosed. The method comprises repetitively irradiating the structure with a transient continuous wave electromagnetic radiation and capturing as a function of time a transient part of the reflection or transmission of the transient continuous wave electromagnetic radiation reflected at or transmitted through the different interfaces of layer-based structure. The method furthermore comprises deriving from the transient part of the reflected or transmitted transient continuous wave electromagnetic radiation as function of time information regarding different contributions in the transient part of the reflected or transmitted transient continuous wave electromagnetic radiation stemming from the reflections at different interfaces of the structure and determining from said information at least geometric information and/or electromagnetic properties of the one or more materials of the structure. A corresponding system also is claimed.

19 Claims, 19 Drawing Sheets

(51) Int. Cl.
*G01N 22/00* (2006.01)
*G01B 15/02* (2006.01)
*G01B 11/06* (2006.01)

(56) References Cited

U.S. PATENT DOCUMENTS

| | | | |
|---|---|---|---|
| 2006/0152229 A1 | 7/2006 | Ju | |
| 2007/0242274 A1 | 10/2007 | Cluff | |
| 2009/0314944 A1* | 12/2009 | Evans | G01N 21/3581 250/341.8 |
| 2010/0235114 A1* | 9/2010 | Levy | G01N 21/9505 702/40 |
| 2012/0228507 A1 | 9/2012 | Rahman et al. | |
| 2015/0211934 A1* | 7/2015 | Van Mechelen | G01B 11/0625 250/339.06 |
| 2017/0023469 A1* | 1/2017 | Zimdars | G01N 21/41 |
| 2018/0038681 A1* | 2/2018 | Van Mechelen | G01N 21/3581 |
| 2019/0078873 A1* | 3/2019 | Saeedkia | G01S 17/10 |
| 2019/0383599 A1* | 12/2019 | Gregory | G01N 33/32 |

OTHER PUBLICATIONS

Hauck et al., "Terahertz Inline Wall Thickness Monitoring System for Plastic Pipe Extrusion," AIP Conf. Proc. vol. 1593, 2014, pp. 86-89, available at least as early as Dec. 31, 2014.

Pourkazemi et al., "Novel Illumination and Parameter Extraction Technique for the Characterization of Multilayer Structures in the GHz Range with Deep Sub-Wavelength Resolution," IEEE, 2015, 4 Pages, available at least as early as Dec. 31, 2015.

Stanze et al., "Multilayer Thickness Determination Using Continuous Wave THz Spectroscopy," IEEE Transactions on Terahertz Science and Technology, vol. 4, No. 6, Nov. 30, 2014, pp. 696-701.

Lee et al., Thickness and Permittivity Measurement in Multi-Layered Dielectirc Structures Using Complementary Split-Ring Resonators, Mar. 31, 2014, IEEE Sensore Journal, vol. 14 , pp. 695-700.

European Search Report from EP Application No. EP15173035, dated Dec. 1, 2015.

International Search Report and Written Opinion from PCT Application No. PCT/EP2016/064208, dated Aug. 22, 2016.

* cited by examiner

For phase=0:Δϕ:360
For Attenuation=0:ΔAttenu :1
    Δϕ
    ⇩
  [Reference] ==> Result
    ⇧
  ΔAttenu
if Result == Sample
Stop
Go to the next step For phase=0:Δϕ:360
For Attenuation=0: ΔAttenu :1
For Delay=0:Δdel :100 ps if  Result == Sample Stop
Go to the next step

CHARACTERIZATION OF MULTILAYER STRUCTURES

FIELD OF THE INVENTION

The invention relates to the field of characterization of materials. More particularly, the present invention relates to methods and systems for characterizing layer-based structures, such as multi-layer structures, in a non-destructive way.

BACKGROUND OF THE INVENTION

Characterization of materials at microwave domain is widely applied and very important for a wide range of applications. Also, accurately determining geometrical parameters and/or electromagnetic properties of layers in a Multilayer Structure (MLS) is applied widely. A large number of characterisation techniques have been proposed over the years for calculating such dielectric properties of multilayer structure or geometrical parameters. Nevertheless, study of these methods reveals that there is still need for a good characterisation technique.

Some of the existing methods are not suitable for new materials to be tested. For example, ultrasonic Testing cannot be used for rubber or soft plastic because the polymers absorb nearly all sound energy, and reflect essentially no sound waves. The mesh or fabric of a composite material so highly scatters and disperses the ultrasonic waves that an extremely noisy reflection results. Through-transmission air-coupled ultrasonic testing requires access to both sides of the sample. Radiography is generally used to detect changes in bulk density.

Under most operating conditions the most common flaw leading to failure in materials is delamination. In a delamination failure, an essentially two dimensional separation occurs between adjacent component layers. This separation between layers does not typically result in a detectable change in local density, and is therefore not detectable in a radiograph. Durometer Testing (DT) is the current state of the art for nondestructive testing of rubber parts, using a needle that penetrates a portion of the rubber and connects to a strain gauge. Durometers have poor practical utility, but they represent the best technology currently available for non-destructive testing of rubber joints.

Using of High Density Polyethylene (HDPE) is growing rapidly due to its corrosion resistance characteristics and ease of construction when compared to metal piping systems. As a result of its widespread use, a method of inspecting the piping joints is becoming essential to ensure safe, sound piping systems. This is particularly true for butt fusion joints, which can contain micro-structural defects that impact long term integrity of the piping system. These defects have proven to be difficult to detect using traditional means of inspection, such as ultrasound, because these micro-structural defects do not result in an acoustic reflector or impedance difference. Something else, in many situations, it may be neither convenient nor possible to access both sides of the material to be tested and then reflective measurement techniques are the only option.

Various methods have been employed in the past to determine the complex dielectric properties of materials from measured refection and transmission coefficients. The most common procedure to obtain the complex permittivity ($\varepsilon$) and complex permeability ($\mu$) from S-parameters was proposed by Nicolson and Ross in 1970, and modified by Weir in 1974. It is referred to as the Nicolson-Ross-Weir (NRW) method. This method needs ultra-width band with high frequency resolution to extract relative permittivity or relative permeability for single layer. Finding characteristics of a very thin single layer of material is big challenge for this algorithm. Synthetic Aperture (SA) imaging, which is based on Frequency-Modulated Continuous-Wave (FMCW), also needs ultra-width band frequency. This method uses prior knowledge in order to have sufficient accuracy. It uses electromagnetic waves in the millimeter wave range and has a few millimeter range of depth and lateral resolution. Another method which is used for deriving geometrical and also distance information is Time Domain Reflectometery (TDR). For small size and also thin layers, electromagnetic radiation in the millimeter or THz range will be used. This method uses pulses and works based on time-of-flight which is a complex and expensive system.

Consequently, there is still need for good methods and systems for characterising layer-based systems.

SUMMARY OF THE INVENTION

It is an object of embodiments of the present invention to provide a method and system for detecting characteristics of structure comprising one or more materials. The structure may be a layer-based structure, such as for example a multi-layer structure.

Typical characteristics of a material, e.g. a layer, that can be determined are a layer thickness, its complex valued dielectric permittivity, its magnetic susceptibility or another electromagnetic property. In general, all parameters that have an impact on the dielectric or magnetic properties of the layers can be determined. For example, if the temperature or density dependency of the permittivity is known, it is also possible to extract temperature or density of a given structure. If these need to be determined, the structure should be known or at least a part of the structure where the temperature or density dependency should be derived should be known. Another example of a parameter may be the pressure. It is an advantage of embodiments of the present invention that such parameters can be determined for each of the different layers of a multi-layer structure, when such a multi-layer structure is under study.

It is an advantage of embodiments of the present invention that continuous waves can be used as the methods and systems providing such continuous waves are less complex than for example pulsed systems. It is an advantage of embodiments of the present invention that only the reflected signals or only the transmitted signal are required.

It is an advantage of embodiments of the present invention that, for obtaining physical parameters of a layer structure, only single frequency electromagnetic waves are required and that there is no need for using different frequencies in the case of pure dielectric or pure magnetic materials. If both permittivity and permeability are unknown, two frequencies need to be used.

It is an advantage of embodiments of the present invention that the method can be applied at any frequency. It is an advantage of embodiments of the present invention that the technique can be applied in a waveguide-based system as well as in free space. The technique may in at least some embodiments be performed at a frequency in at least the range 0.1 GHz to 100 THz, e.g. at a frequency in a range between 0.1 GHz and 10 THz. In general, the layers of the structure under investigation should be first of all at least sufficiently transparent for the used EMW such that the emitted waves can interrogate all layers from the foreside up to the backside. Where embodiments of the present invention reference is made to sufficiently transparent this is related to the dynamic range, the noise floor, the accuracy and averaging mode of the sensor system. One needs to observe at least the first transition in the reflection signal due to the propagation path comprising the last layer, hence the interface between the backside and the surrounding medium should be measurable by the detector.

Finally the frequency of the EMW advantageously is not too large, so that vector measurement can be executed.

It is an advantage of embodiments of the present invention that the method is not restricted by the number of layers being present. The layers should only be sufficiently different in reflecting behavior so as to be able to detect the interface based on reflection.

It is an advantage of embodiments of the present invention that the method and systems can be applied for a variety of applications, including but not limited to piping industry, wind energy industry, automotive, biotechnology, food industry, pharmacy, etc.

It is an advantage of embodiments of the present invention that the information regarding the layers required for determining parameters using the method is limited or that the method even can be applied blindly, i.e. without input on the layers.

It is an advantage of embodiments according to the present invention that the method allows both identifying the number of layers being present as to determine electromagnetic/geometrical characteristics of the layers.

It is an advantage of embodiments according to the present invention that the method allows to locate a defect in any of the layers or at any of the interfaces between two consecutive layers as well to determine nature of this defect. It is an advantage of embodiments according to the present invention that the depth resolution (or layer thickness resolution) only depends on the "equivalent" time resolution, therefore allowing to optimize depth resolution by optimizing the time resolution of the setup. The "equivalent" time resolution is obtained by accurately repetitive sampling of the signal.

It is an advantage of embodiments according to the present invention that the method is independent of the wavelength used. It is sufficient that the layer-based structure is not absorbing too dominantly so that a reflection signal can be measured from the backside of the sample.

It is an advantage of embodiments according to the present invention that no transmitter signals need to be taken into account, but that the method can be used, based solely on a reflected signal or vice versa that no reflection signals need to be taken into account, but that the method can be used, based solely on a transmission signal. Although embodiments of the present invention in the present description mainly are described with reference to measurement of transient reflection signals, alternative embodiments wherein measurements of transient transmission signals are used are herewith also mutates mutandis disclosed if the skilled person replaces in the different embodiments all transient reflection signals obtained from the multi-layer structure by transient transmission signals obtained from the multi-layer structure. The subtle differences between the analysis of the transient reflection signal and the transient transmission signal are dealt with separately at the end of the detailed description. It is an advantage of embodiments according to the present invention that the method is a contact-free method. It is an advantage of embodiments according to the present invention that the method is a non-destructive characterization method.

It is an advantage of embodiments according to the present invention that the layer-based structure may be deposited on ma metal or may be backed up by a water layer.

The above objective is accomplished by a method and device according to the present invention.

The present invention relates to a method for determining characteristics of a structure comprising one or more materials, such as for example in some embodiments a layer-based structure, the method comprising irradiating the layer-based structure repetitively with a continuous wave electromagnetic radiation comprising a transient part, the structure being sufficiently transparent to the used electromagnetic radiation, the electromagnetic radiation being of a single frequency or a narrow range around a single frequency, capturing from the repetitive irradiating as a function of time a transient part of the reflection of the continuous wave electromagnetic radiation reflected at different interfaces of the structure or a transient part of the transmission of the transient continuous wave electromagnetic radiation transmitted through the different interfaces of the layer-based structure, deriving from the transient part of the reflected or transmitted continuous wave electromagnetic radiation as function of time information regarding different contributions in the transient part of the reflected or transmitted continuous wave electromagnetic radiation stemming from the reflections at or transmissions through different interfaces of the structure, and determining from said information at least geometric information and/or electromagnetic properties of the one or more materials of the structure. The structure may be a layer based structure and geometric information and/or electromagnetic properties of the different layers of the layer based structure may be determined.

The capturing of the transient reflection signal should at least last that long that also the reflection of the backside of the material is captured. The emitted transient EMW should be acquired at least as long as the full propagation time through the full structure when analyzing the full structure.

It might be that we only are interested in a particular interface, so in these cases the reflected signal should be captured long enough to capture a reflected wave reflected from the interface of interests.

Said deriving may comprise the deconvolution of the transient part of the reflected or transmitted continuous wave electromagnetic radiation as function of time into different contributions in the transient part of the reflected or transmitted continuous wave electromagnetic radiation stemming from the reflections at or transmissions through different interfaces of the structure.

Said deconvolution may be based on using a superposition model of the different contributions in the transient part of the reflected continuous wave electromagnetic radiation.

Said deconvolution may comprise subsequently identifying reflections at the different interfaces, whereby reflections at interfaces further away from the irradiation source are identified in a later step than reflections at interfaces closer to the irradiation source.

Said deconvolution may comprise combining contributions made by the reflection or transmission of the layers, contributions derived from the original irradiation signal and effects caused by leakage of radiation.

Said deriving may comprise identifying different moments in time corresponding to different contributions in the transient part of the reflected or transmitted continuous electromagnetic radiation wave stemming from the reflections at or transmissions through different interfaces of the structure.

Identifying different moments in time may be based on identification of a discontinuity in the reflected radiation as function of time due to an amplitude and phase shift induced by the addition of a new reflected wave "m+1" to the superposition of already "m" received waves.

Identifying different moments in time may be based on identification of sudden differences in behavior derived from comparison of a reflection or transmission based signal and the irradiation based signal.

Determining from said information at least geometric information and/or electromagnetic properties may comprise determining from said different moments in time at least geometric information regarding different layers of the layer-based structure. It is an advantage of embodiments of the present invention that the resolution at which geometric information, e.g. thickness of the layers, is determined is a function of the time resolution at which the reflected or transmitted electromagnetic radiation can be detected and therefor can be improved by improving the time resolution.

Said irradiating may be irradiating with electromagnetic radiation of substantially one frequency. It is an advantage of embodiments of the present invention that a single frequency or a small frequency range around a single frequency can be used. Where reference is made to a small frequency range, reference is made to an almost monochromatic radiation with a given phase noise. The larger the phase noise, the more samples are required for properly processing the signal, e.g. via histogram smoothing, and therefore the longer one needs to measure. In some embodiments, also two or more frequencies can be used, e.g. if more parameters need to be derived, but it is an advantage of embodiments of the present invention that no wideband radiation is required. Where in embodiments reference is made to a small frequency range or a narrow range, reference may be made to a narrow bandwidth of 1 to 2 GHz around a carrier frequency. Such a carrier frequency may be in the range 0.1 GHz and 100 THz.

Said method may furthermore comprise smoothing at least the reflected or transmitted continuous wave electromagnetic radiation. Smoothing can be performed using e.g. a histogram function, although embodiments of the present invention are not limited thereto.

Smoothing can also be performed on a leakage signal or a signal based on the irradiation signal, when used in the deconvolution.

Deriving from said information at least geometric information and/or electromagnetic may comprise deriving a permittivity and/or permeability of the different layers.

Said irradiating may comprise irradiating with electromagnetic radiation in the range 0.1 GHz to 100 THz.

The method may comprise determining electromagnetic properties of the one or more materials of the structure and the method furthermore may comprise determining based on the electromagnetic properties, one or more of a density, a temperature, a curing level or an elastic strength of the one or more materials of the structure.

The method may comprise determining electromagnetic properties of the one or more materials of the structure and the method furthermore may comprise determining based on the electromagnetic properties the presence of defects in one or more materials of the structure.

The method may comprise determining electromagnetic properties of the one or more materials of the structure and the method furthermore may comprise determining based on the electromagnetic properties the presence of one or more cavities.

The method may comprise determining cavities in an insulation material.

The structure may be a layer-based structure and the method may comprise determining geometric and/or electromagnetic properties of one or more of the layers of the layer-based structure.

The method may comprise determining from said information at least geometric information and/or electromagnetic properties of the one or more materials of the structure without any prior knowledge regarding the one or more materials of the structure.

The method may comprise characterizing a structure in one or more of construction industry, rubber industry or automotive industry.

The present invention also relates to a controller being programmed for performing a method as described above for characterization of a layer-based structure.

The present invention furthermore relates to a system for characterizing a structure comprising one or more materials, the system comprising an irradiation system adapted for generating a repetitive continuous wave electromagnetic radiation for repetitively irradiating the structure, the electromagnetic radiation being of a single frequency or a narrow range around a single frequency, a receiver adapted for capturing from the repetitive irradiations as a function of time a transient part of the reflection or of the transmission of the continuous wave electromagnetic radiation reflected at or transmitted through the different interfaces of the structure, and a processor programmed for deriving, from the transient part of the reflected or transmitted continuous wave electromagnetic radiation as function of time, information regarding different contributions in the transient part of the reflected or transmitted continuous wave electromagnetic radiation stemming from the reflections at or transmissions through different interfaces of the structure, and for determining from said information at least geometric information and/or electromagnetic properties of the one or more materials of the structure.

The processor may comprise a deconvolution means for deconvolution of the transient part of the reflected or transmitted continuous wave electromagnetic radiation as function of time into different contributions in the transient part of the reflected or transmitted continuous wave electromagnetic radiation stemming from the reflections at or transmission through different interfaces of the structure.

The system may comprise a single shot or multi-shot sampler for sampling the transient part of the reflected or transmitted continuous wave electromagnetic radiation at a frequency of at least the repetition frequency of the emitted radiation. The sampler may be selected and configured such that the relative time resolution obtained in the overall sampled signal is sufficiently high that the thicknesses of the layers can be accurately monitored.

The irradiation system may be adapted for generating a continuous wave electromagnetic radiation at a single frequency. The system, in some embodiments, may comprise a single or double frequency generator operating in CW mode and a switch more in particular an SPST (Single-Pole, Single-Throw) switch with a power divider in between In some embodiments, the power divider may receive a leaked signal for the signal generator and waves partially reflecting on the SPST switch. In steady state all signals received by the power divider may feature the same frequency components as the frequency components from the signal generator. At the moment the SPST is switching from on-to-off or vice versa, the signal reflected on the SPST switch may comprise also all harmonics of the transient state of the switch. By providing a filter behind the power divider passing only the latter spectral components, the filtered signal can be used for accurately sampling the reflected transient part of the continuous wave electromagnetic radiation, illustrating one example of a hardware configuration that can be used.

The system may comprises a timing means for controlling the timing of the sampling of the reflected or transmitted transient part of the continuous wave electromagnetic radiation such that the transient part of the reflected or transmitted continuous wave electromagnetic radiation is sampled with a high time-resolution. Such a timing means may comprise one or more of a triggering means and/or switching means.

Such a timing means may comprise a delay creator. Such a delay creator may be a tunable delay creator.

The irradiation source may comprise a transmitter antenna. The receiver may comprise a receiver antenna.

The system may comprise a filtering or smoothing means for filtering or smoothing the signals used in the processing.

The present invention also relates to a computer program product for, when executed on a processor, determining characteristics of a structure, e.g. a layer-based structure, comprising one or more materials the computer program product being programmed for
- receiving information of a repetitive irradiation of the structure with a continuous wave electromagnetic radiation,
- receiving information of the capturing as a function of time of a transient part of the reflection or transmitted of the continuous wave electromagnetic radiation reflected at or transmitted through the different interfaces of the layer-based structure,
- the computer program product furthermore being programmed for deriving from the transient part of the reflected or transmitted continuous wave electromagnetic radiation as function of time, information regarding different contributions in the transient part of the reflected or transmitted continuous wave electromagnetic radiation stemming from the reflections at or transmissions through different interfaces of the layer-based structure, and for determining from said information at least geometric information and/or electromagnetic properties of the one or more materials of the structure.

The computer program product may be implemented as a controller.

The computer program product may be implemented as a data carrier.

In embodiments according to the present invention, the wavelength of the EMW advantageously is substantially smaller than the structure under investigation such that one can assume the principle of a propagating EMW.

In some embodiments, the minimum optical thickness of any material or of any layer of the multi-layer structure may be defined in relation to the sampling resolution time $\delta t$ of the single shot sampler. In the most ideal case one need at least 2 sample points of any layer to extract the characteristics of that layer. This leads to the following condition
$d_{min} > v \cdot \delta t = c/n \cdot \delta$, whereby n is equal to the refractive index of the layer under consideration, and v is the speed of light in that particular layer, e.g.

| $\delta t$ | $d_{min}$ |
| --- | --- |
| 50 fs | $(15/n)$ μm |
| 500 fs | $(150/n)$ μm |
| 5 ps | $(1.5/n)$ mm |

When the number of samples per layer is very limited, the consecutive signal difference Abs[A(t)−A(t+δt)] should be larger than the smallest detectable signal difference $\delta m$. In the worst case at the extreme point of the received signal transient, one derives that $$f_{min} \geq \sqrt{\frac{\delta A_m}{A_M 2\pi^2}} \frac{1}{\delta t}$$

When the received signal is rather near zero, this minimum frequency reads as $$f_{min} \geq \frac{\delta A_m}{A_M 2\pi} \frac{1}{\delta t}$$

In these equations $A_M$ is the maximum of the detected transient signal. When the number of consecutive samples per layer is N, and the sampling resolution time is again $\delta t$ the constraints on the minimum frequency is N times more relaxed. In all the equations the Nyquist criterion is respected.

The propagation within each single layer should advantageously lead to a measurable signal difference. If the electromagnetic thickness of a layer is much smaller than the wavelength inside a layer, the thickness cannot be extracted. The same holds for the full structure: the total electromagnetic thickness of the structure should be large enough to extract its thickness.

It is an advantage of embodiments of the present invention that a method is provided that can be performed from one side of the material, rather than that it is strictly required to perform the method from two sides of the material.

It is an advantage of embodiments of the present invention according to the present invention that the method does not require ionizing radiation.

It is an advantage of embodiments of the present invention that defects in structures can be detected in a contact free manner.

It is an advantage of embodiments of the present invention that properties such as thickness, defective regions, vibrations, humidity, diffusion depth of materials and/or water in the structure, temperature, density, etc. can be determined.

It is an advantage of embodiments according to the present invention that measurements with a depth resolution of up to 0.3 mm, for example of up to 0.03 mm can be performed.

It is an advantage of embodiments according to the present invention that measurements with a lateral resolution of up to 30 mm, for example of up to 3 mm can be performed.

It is an advantage of embodiments of the present invention that methods can be applied in the meter range, the cm range, the mm range and the sub-mm range. Applications can be found in construction materials, characterization of pipes, of walls, of coatings on metallic sheets, of ceramic sheets, of multilayer coatings, etc.

It is an advantage of embodiment of the present invention that methods can be applied in construction industry, for examples in determination of energy performance certificate, characterization of thermal insulation injection, cement monitoring such as degree of curing, ageing, strength properties and correlation of cement composites, characterization of rebar position and thickness, characterization of rubber, etc. . . .

The present invention also relates to a data carrier comprising a computer program product as described above, encoded thereon.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
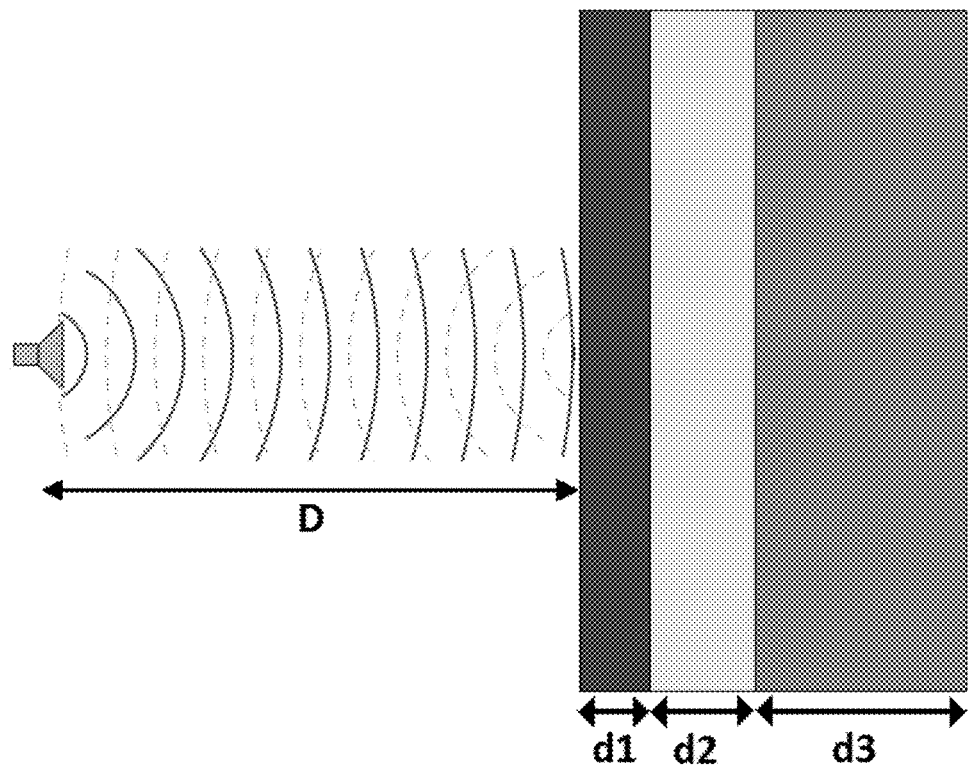
FIG. 1 illustrates an irradiation configuration comprising an antenna for irradiating a three-layer structure as can be used in an embodiment of the present invention.

The drawings are only schematic and are non-limiting. In the drawings, the size of some of the elements may be exaggerated and not drawn on scale for illustrative purposes.

Any reference signs in the claims shall not be construed as limiting the scope. In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Figure 18:
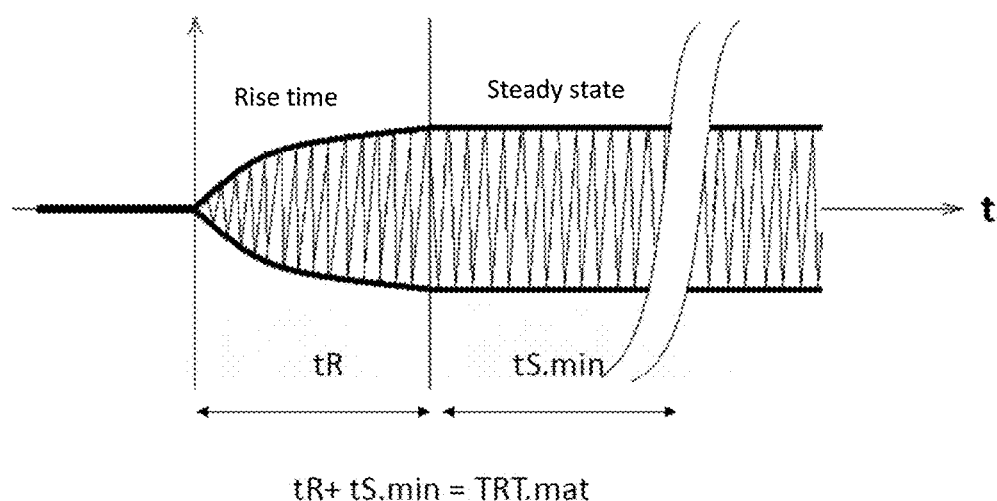
FIG. 18 illustrates an example of an electromagnetic wave with transient part, as can be used in embodiments according to the present invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments according to the present invention reference is made to a layer-based structure, reference is made to a system comprising at least one layer. Embodiments of the present invention are especially useful for characterising a structure comprising multiple layers, also referred to as multi-layer structure (MLS), whereby parameters of the different layers can be derived.

Where in embodiments of the present invention reference is made to continuous wave radiation reference is made to an electromagnetic wave switched on from zero to a monochromatic steady-state wave as illustrated in FIG. 18, in principle with a duration $tR+tS.min$ at least equal to the full round trip time $TRT.mat$ of the radiation inside the multi-layer structure under investigation, in contrast to pulsed radiation.

According to embodiments of the present invention, the initial reflection of the continuous wave radiation is captured, i.e. the transient part of the reflection of the continuous wave radiation is captured. Such a transient part, starts from zero where no reflection is measured yet till the measured reflection reaches steady state, and all contributions of reflections at the interfaces between all the layers have reached the receiver.

Where in embodiments reference is made to the deconvolution of a signal, reference is made to splitting of a signal or wave in different contributions. Such deconvolution typically may be performed to distinguish the contributions of different reflections at the different interfaces of the different layers.

Where in embodiments of the present invention reference is made to a structure, reference may be made to a layer-based structure, although also other structures that are not layer-based.

According to a first aspect of the present invention, a method is provided for determining characteristics of a structure, comprising one or more materials. The structure may be layer-based structure, although embodiments are not limited thereto. The method is especially suitable for identifying geometrical and/or electromagnetic properties of multiple layers in a multiple layer structure, although also properties of a single layer can be determined using the method. Characterisation may be performed of layers or materials in depth direction or in lateral direction. According to embodiments of the present invention, the method comprises irradiating the structure repetitively with a continuous wave electromagnetic (EM) radiation comprising a transient part, and capturing a transient part of the reflected or transmitted continuous wave electromagnetic radiation (EM) reflected at or transmitted through the different interfaces of the structure. The electromagnetic radiation typically is of a single frequency or of a narrow range around a single frequency.

Capturing the transient part of the reflected or transmitted continuous wave electromagnetic (EM) radiation as function of time thereby comprises capturing of the reflected or transmitted signal from zero intensity, i.e. when the first reflected component of the reflection or transmission has not yet reached the receiver, up to the moment a steady state reflection is received at the receiver, comprising all contributions of the reflection or transmission at the different interfaces of the structure.

Whereas further features and embodiments will mainly be described based on the reflected signal, embodiments of the present invention are not limited thereto and apply mutates mutandis to the characterisation based on transmitted signals.

In order to obtain a good time resolution, the capturing of the transient part may be performed by single or multiple shot sampling of the reflection of the repetitive irradiation with the continuous wave electromagnetic radiation. In other words, repetitive irradiation with continuous wave EM radiation can be performed, whereby the irradiation each time is performed until the reflected signal reaches steady state, the repetitive irradiation allowing to subsequently sample during the repetitive irradiations different points in time of the reflected signal. Since the transition over time from no reflection to steady state reflection by the full layer-based structure is to be studied, the repetitive irradiation should also comprise a transient part from no irradiation to steady state CW radiation. Embodiments of the present invention furthermore comprise, deriving from the transient part of the reflected continuous wave EM radiation as function of time, information regarding the different contributions in the transient part of the reflected continuous wave electromagnetic radiation stemming from the reflections at different interfaces of the structure. Deriving information thereby may comprise identifying discontinuities in the reflected radiation as function of time, e.g. due to an amplitude and phase shift induced by the addition of a new propagation path reflected at an interface positioned further away to the receiver, to the signal representative of already received reflection waves at the receiver. It thus may comprise deriving timing information regarding when a certain component in the reflection signal is received at the receiver. The method thereby is based on the time of flight principle, taking into account that reflection at interfaces of layers being positioned further away from the receiver will require a longer time to reach the receiver than reflection at interfaces of layers being positioned closer to the receiver. It may comprise deconvolution of the reflected continuous wave electromagnetic radiation to identify the different contributions. The model used when performing the deriving may be a superposition based model, whereby the different contributions are superposed to form the overall signal.

Embodiments of the present invention also comprises determining from said information at least geometric information and/or electromagnetic properties of the different layers of the layer based structure. The geometric information may for example be determined based on a time of flight calculation for the different components in the transient part of the reflected continuous wave EM radiation. Electromagnetic properties can be determined based on the different reflection components identified in the transient part of the reflected continuous wave EM radiation. Such electromagnetic properties may be a permittivity or permeability, but more generally may be any parameter influencing the dielectric properties or magnetic properties of one or more or all of the layers in the layer-based structure.

By way of illustration, embodiments of the present invention not being limited thereto, the method is further described with reference to a 3-layer structure. Nevertheless, it will be clear to the person skilled in the art that embodiments of the present invention are not limited thereto. More particularly, methods and systems according to embodiments of the present invention can be used independent of the number of layers that are present, e.g. for at least 1 layer, at least 2 layers, at least 3 layers, at least 5 layers, at least 7 layers, etc.

Using the transient time response method, the different characteristics of the three layers in the multi-layer structure of the present example, such as thickness and complex permittivity can be determined. In the example it is supposed that the conductivity for all layers are zero and the relative permeability for all layers are one. The model used in the present example is based on superposition.

The setup used in the present example is similar as the one shown in FIG. 1. Electromagnetic (EM) waves are launched from an antenna towards the three-layer structure under investigation. FIG. 1 illustrates such a three-layer structure and an emitting and receiving antenna positioned at a distance D with respect to the three layer structure. The different geometric and EM properties that could be derived are shown in the table.

Once the EM wave launched towards the three-layer structure hits the front side of the first layer, the EM energy will be divided into three parts: one part will be reflected, one part will be transmitted and one part will be absorbed. The amount of energy in the different parts will depend on the characteristics of the layer structure. The reflected energy, reflected at each of the three layers, is returned to the receiver antenna as a scattered wave. When a continuous wave is irradiated to the structure, a continuous wave signal is received in the antenna except for these moments in time that are representative of reflected wave contacts at interfaces. Furthermore, characteristics measured characteristics also can illustrate that the wave shows a jump to another phase and amplitude which is depending on the interface characteristics of the interface between the layers. Since in a layer-based structure, the reflection at different interfaces of and between the layers will result in a different contribution to the overall reflection signal, these different reflections, which thus can be identified in the reflection signal will contain information of the different layers.

Figure 2:
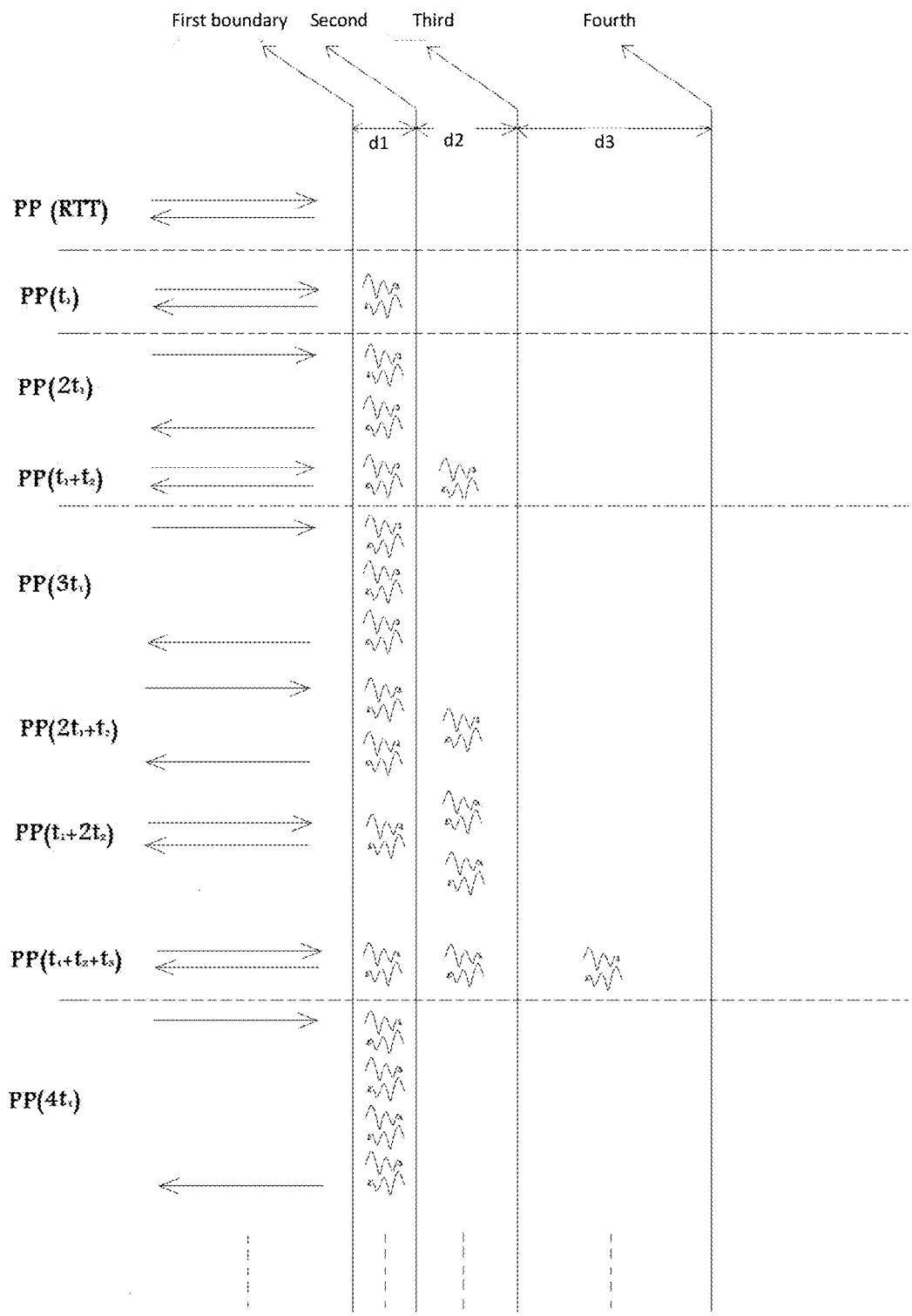
FIG. 2 provides a schematic illustration of the propagation multi-pathways of an EM wave incident on a multi-layered structure and partially bouncing forth and back between the various interfaces, as is used in an embodiment according to the present invention.

In FIG. 2, the reflected wave that is started after Round Trip Time (RTT) is shown. The RTT is the time needed for an EM wave to propagate back and forth between the emitter and the front side of the multi-layer structure under investigation, separated by a distance D from each other. In the further analysis the moment when the first signal is detected by the receiver, we will refer to time moment "zero". The different components are shown and their propagation in the different layers are indicated. Reflection of the wave will continue as long as the signal generator is irradiating. Any Propagation Path (PP) illustrates a specific path. These paths are determined by unique equations that create some boundary conditions with respect to each other. For example Propagation Path (Round Trip Time), PP (RTT) is the first path that is received in the sampler. PP (t1) is the second path, corresponding with reflection at the interface between the first and second layer. Further additional reflection signals are PP (2t1) or PP (t1+t2), whereby PP (2t1) corresponds with a wave travelling twice between the interfaces of the first layer and whereby (t1+t2) corresponds with a wave travelling through the first and the second layer and then returning through the second and the first layer to the receiver. Which one of PP (2t1) or PP (t1+t2) is sooner, depends on the electrical characteristics and thicknesses of first and second layers. After that the rest paths starts to reflect and so on. After a short time, the captured reflection signal goes to the steady state. TRM can extract all of geometric and electromagnetic characteristic of the multi-layer structure by using transient time signal.

The method allows to extract blindly the dielectric characteristics of the individual layers of the multi-layers structure from the transient reflection curve. According to assumptions described above, one still have nine parameters to determine, as illustrated in FIG. 1: the thickness and complex valued permittivity of each layer. The following basic rules are applied for the analysis: 1) the total reflected wave has been collected from all of these paths and the reflected wave follows the superposition rule. 2) PP (RTT) and PP (t1) are unique and they will be reflected respectively. After that PP (t1+t2) and PP (2t1) reflections are captured, although it is not clear which reflection occurs first. Nevertheless, PP (2t1) can be calculated immediately after detecting PP (M. So after capturing transient signal and also detecting PP (RTT) and PP (t1), distinguishing PP (2t1) from PP (t1+t2) can be done easily. After that some other paths start to reflect such as PP (nt1+t2), PP (t1+nt2), PP (nt1+mt2), PP (t1+t2+t3), m,n∈N and so on. The vital condition that is to be mentioned is that capturing must be done from the time where there is no reflection because the Nose of the curve allows to determine the first layer reflection coefficient and also t1. After rewriting some equations it can be demonstrated that by using two frequencies f1 and f2 (f1≠f2) one can find these fifteen parameters uniquely (See FIG. 1). It means that one can calculate complex permeability, complex permittivity and also individual thickness for three layers structure.

Where in embodiments of the present invention reference is made to a method that allow blind detection, reference is made to a method where no information regarding geometric and electromagnetic properties of the structure is required for determining geometric and electromagnetic properties of the one or more materials or layers in the structure.

Figure 3:
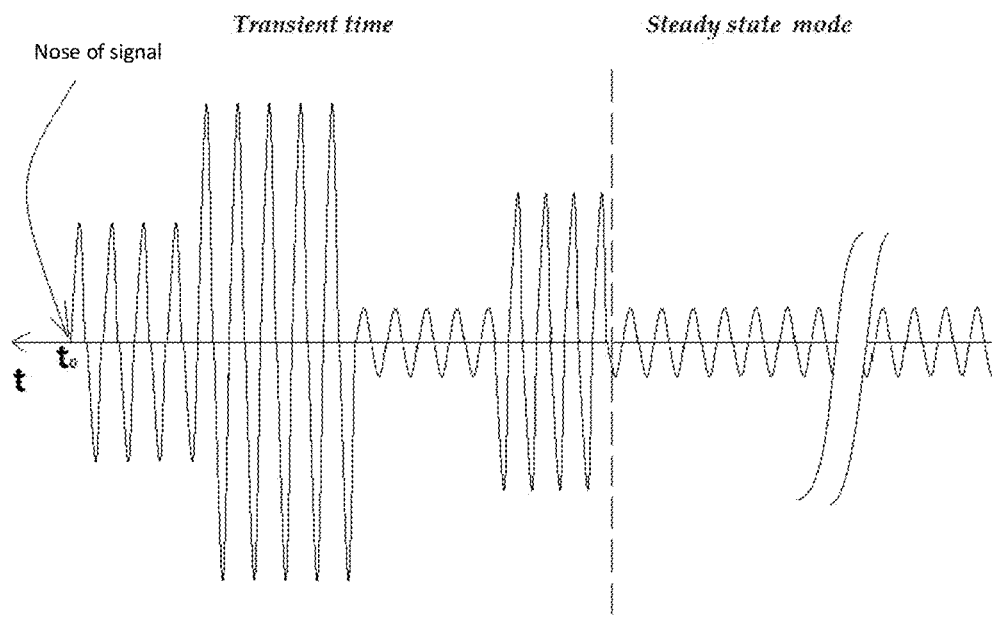
FIG. 3 provides a schematic illustration of the time evolution of the EM wave being reflected on the various interfaces of the multi-layer structure, as used in embodiments according to the present invention.

Embodiments of the present invention may make use of calibration information to translate an electromagnetic property obtained for example in a fully blind way by means of a method according to the present invention into a specific physical or chemical knowledge of the material, such as a composition, a density, a temperature, etc. Calibration information may be obtained for example by measuring without material, i.e. in absence of any material, and/or by using a calibration mirror. FIG. 3 illustrates the overall reflected signal illustrating a transient part and a steady state part in the reflected continuous wave EM radiation as function of time. The nose of the signal identifies the first reflected component received in the receiver, typically corresponding with the reflection at the surface of the first layer in the layer-based structure facing the emitter and the receiver. It is to be mentioned this curve shows a transient state and after a sufficient superposition of the multiple reflected waves on the various interfaces, the steady state reflection coefficient of the multi-layer structure is reached. Hence we get again a one monochromic sinusoidal curve, with an amplitude and phase determined by the steady-state reflection coefficient of the multi-layer structure.

Figure 17:
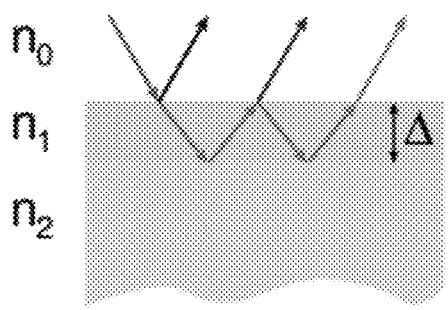
FIG. 17 illustrates the different paths that occur for reflection at a single layer.

In a similar way, in transient regime, the reflection coefficient on a single layer, an example shown in FIG. 17, converges gradually from the front surface amplitude reflection coefficient $r_{01}$ in discrete steps after each round trip "m" towards the steady-state slab amplitude reflection coefficient $r_{slab}$. The steady state slab reflection coefficient is given by the following equation:

$$r_{slab} = r_{01} + t_{01}t_{10}r_{12}p^2 \sum_{m=0}^{\infty}(r_{10}r_{12}p^2)^m$$
$$= r_{01} + t_{01}t_{10}r_{12}p^2 \frac{1}{1-r_{10}r_{12}p^2}$$

wherein $r_{01}$ is the reflection coefficient at the interface of the air with layer for incidence from the air side, $r_{12}$ is the reflection coefficient at the interface between the layer and the substrate (medium with refractive index n2), $r_{10}$ is the reflection coefficient for waves incident on the interface between the layer and air, for incidence from the layer side, $t_{01}$ and $t_{10}$ are the transmission coefficient at the interface air/layer for incidence from air respectively layer side, and $p_1$ is the single pass propagation factor through the first layer $p_1 = \exp(-k_0\sqrt{\varepsilon_{r1}\mu_{r1}}d_1)$.

According to at least some embodiments of the present invention, the EM signal irradiation of the layer under test comprises irradiating with a transient part of duration tr and a steady state part tS.min. The sum of both advantageously is at least equal to the round trip time of the EM wave inside the multi-layer structure. For maximizing the Signal-to-Noise ratio it is better to have a fast rise time, as the longer rise time induces during a longer time smaller maximum signals, which lead to stronger constraints on the minimum frequency one can use to illuminate the sample.

Decreasing the transient time tR below the rise time $tss = 0.35/f_{ss}$ of the steady state (ss) part of the single frequency illumination signal does not make much sense, as beyond this point the performance of the system does not really improve. Ideally from a point of view of SNR, the rise time should be smaller than the round trip time in the thinnest layer (with optical thickness $d_{min}$; see paragraph below) under the condition that this round trip time is larger than the rise time $t_{ss}$.

Further features and advantages will be illustrated further below, when referring to the different examples.

In a second aspect, the present invention also relates to a system for characterizing a layer-based structure. The system may be especially suitable for performing a method as described in embodiments of the first aspect, but is not limited thereto. According to embodiments of the present invention, the system typically comprises an irradiation system adapted for generating a repetitive continuous wave electromagnetic radiation comprising a transient part for repetitively irradiating the layer-based structure. The irradiation system may for example be an emitting antenna. The irradiation system may in one example be an irradiation source working in continuous wave mode combined with a switch so as to generate the repetitive transient irradiation signal, comprising a transition from 0 intensity to a steady state continuous mode. In an alternative example, the irradiation source may be switched on and off repetitively, but this may result in a less stable irradiation signal. The irradiation source may be adapted for operating at a single frequency or a narrow range around a single frequency. In case more electromagnet properties need to be derived, an irradiation source emitting at two or more frequencies or a plurality of irradiation sources emitting at different frequencies may be used, in order to derive more information. The irradiation source typically is not a broadband irradiation source. The irradiation frequency may be determined based on the application envisaged, i.e. the radiation should not be absorbed too strongly by the structure under study and the wavelength should be substantially smaller than the dimensions of the structure under study. An example of a range of frequencies for radiation that can be used in at least some applications is 1 GHz to 100 THz.

The system also comprises a receiver adapted for capturing from the repetitive irradiations as a function of time a transient part of the reflection of the continuous wave electromagnetic radiation reflected at the different interfaces of the layer-based structure. Such a receiver may comprise a receiving antenna. In one example, such a receiver may be based on a sampling system for single shot or multiple shot sampling for sampling the transient part of the reflected continuous wave electromagnetic radiation at a frequency of at least the repetition frequency of the emitted radiation. Such a sampler may be selected and configured such that the relative time resolution obtained in the overall sampled signal is sufficiently high that the thicknesses of the layers can be accurately monitored. The sampler may for example be a sampling scope uniquely designed to capture, display and/or analyze repetitive signals. Triggering capabilities are likewise crafted for repetitive signals. A sampling scope captures a set of non-contiguous samples spaced in time when it sees its first trigger condition. The scope delays the trigger point, captures the next set of points, and places them on its display with the first set of points. It repeats this process, building up the waveform in an infinite-persistent mode over successive acquisitions. The precision in the amount of time from the first trigger condition to a next trigger condition delayed slightly from the first determines the accuracy.

According to embodiments of the present invention, the system furthermore comprises a processor programmed for deriving, from the transient part of the reflected continuous wave electromagnetic radiation as function of time, information regarding different contributions in the transient part of the reflected continuous wave electromagnetic radiation stemming from the reflections at different interfaces of the layer-based structure. The processor may for example comprise a deconvolution unit for the deconvolution of the transient part of the reflected continuous wave electromagnetic radiation as function of time into different contributions in the transient part of the reflected continuous wave electromagnetic radiation stemming from the reflections at different interfaces of the layer-based structure. The processor may comprise a filtering or smoothing means for filtering or smoothing the signals used for processing. Such smoothing may in one example be based on a histogram function, although embodiments are not limited thereto.

The processor may be programmed for taking into account a superposition model for the received reflection of the continuous wave electromagnetic radiation.

The processor furthermore comprises a means for deriving, from the obtained information, geometrical and/or electromagnetic properties of the different layers in the layer-based structure. The latter may for example be based on a time of flight model.

Figure 4:
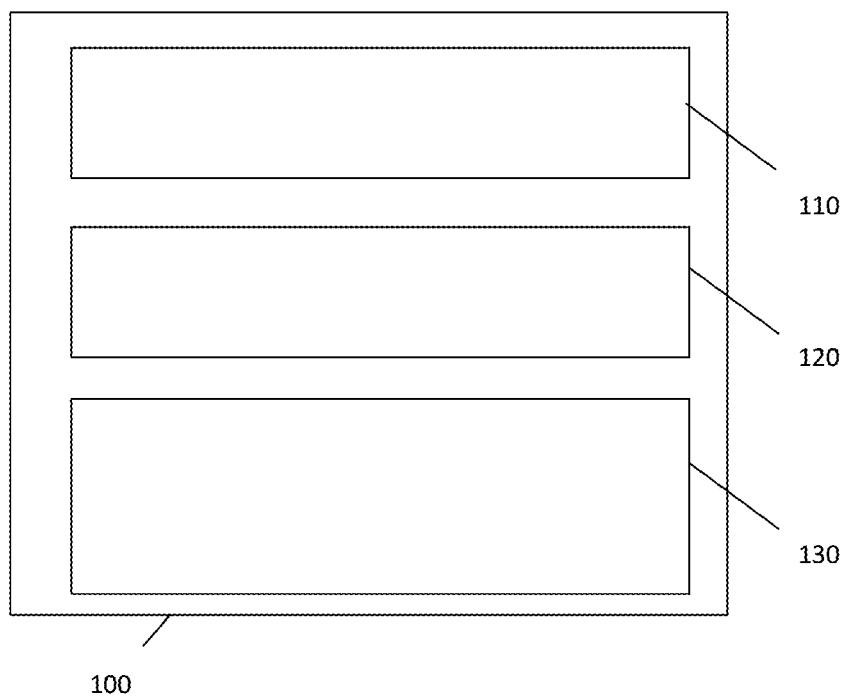
FIG. 4 illustrates a schematic representation of a system according to an embodiment of the present invention.

By way of illustration, FIG. 4 illustrates a schematic representation of some essential components of the system. The system 100 comprises an irradiation source 110, a receiver 120 and a processor 130.

Figure 5:
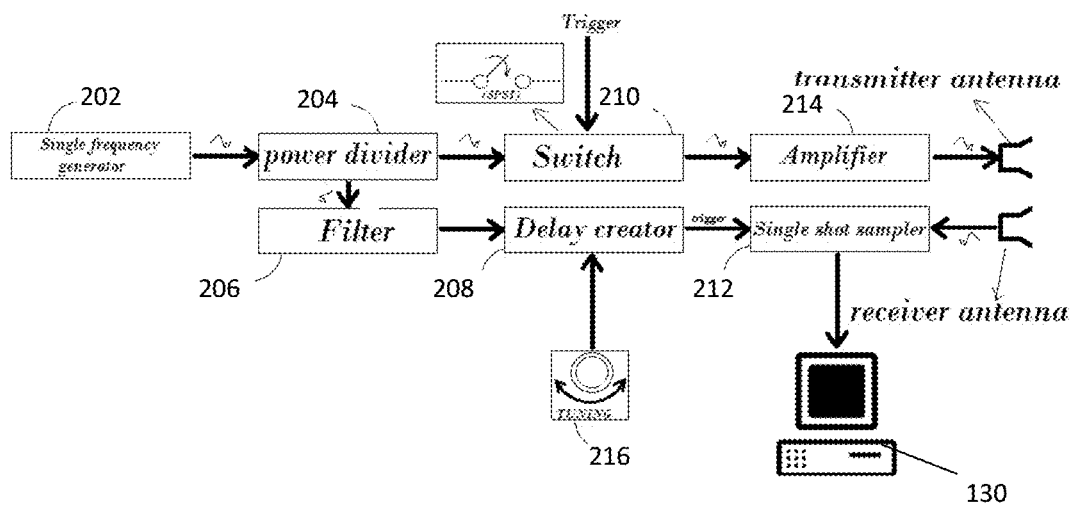
FIG. 5 illustrates an exemplary hardware as can be used for performing the transient radar method according to an embodiment of the present invention.

FIG. 5 illustrates an exemplary system of an embodiment according to the present invention. The system comprises an irradiation system comprising a single frequency generator 202, a power divider 204, an ON/OFF switch 210 for controlling repetition of the irradiation source and an amplifier 214 for amplifying the signal before it is delivered to a transmitter antenna for irradiating the layer-based structure. The system also comprises a receiver system, using a part of the irradiation signal for controlling the sampling of the received reflected signal. The latter is obtained through the power divider 204. The receiver system comprises a filter 206, a delay creator 208, controlled by a tuning means 216, for creating the appropriate delay for accurately sampling, and a sampler, e.g. a single shot sampler 212, sampling the reflected signal received from the receiver antenna. The sampled result is then processed in the computer 130. It is to be understood that the system shown only is an example of a system according to an embodiment of the present invention and that the present invention is not limited thereby.

In one aspect, the present invention also relates to a controller for performing a method as described in embodiments of the first aspect of the present invention. The controller may be implemented in software or hardware. Features and advantages may correspond with a feature or step of a method according to an embodiment of the first aspect.

In yet another aspect, the present invention also relates to a computer program product for, when executed on a processor, determining characteristics of a layer-based structure. Such a computer program product may be programmed for receiving information of a repetitive irradiation of the layer-based structure with a continuous wave electromagnetic radiation comprising a transient part, and receiving information of the capturing as a function of time of a transient part of the reflection of the continuous wave electromagnetic radiation reflected at the different interfaces of the layer-based structure, The computer program product furthermore is programmed for deriving from the transient part of the reflected continuous wave electromagnetic radiation as function of time, information regarding different contributions in the transient part of the reflected continuous wave electromagnetic radiation stemming from the reflections at different interfaces of the layer-based structure, and for determining from said information at least geometric information and/or electromagnetic properties of the different layers of the layer based structure. The computer program product may be stored on a processor. One configuration of such a processor may for example include at least one programmable computing component coupled to a memory subsystem that includes at least one form of memory, e.g., RAM, ROM, and so forth. It is to be noted that the computing component or computing components may be a general purpose, or a special purpose computing component, and may be for inclusion in a device, e.g., a chip that has other components that perform other functions. Thus, one or more aspects of the present invention can be implemented in digital electronic circuitry, or in computer hardware, firmware, software, or in combinations of them. For example, each of the method steps may be a computer implemented step. Thus, while a processor as such is prior art, a system that includes the instructions to implement aspects of the methods for determining properties of a layer-based structure is not prior art. The present invention thus also includes a computer program product which provides the functionality of any of the methods according to the present invention when executed on a computing device.

In another aspect, the present invention relates to a data carrier for carrying a computer program product for characterising a layer-based structure. Such a data carrier may comprise a computer program product tangibly embodied thereon and may carry machine-readable code for execution by a programmable processor. The present invention thus relates to a carrier medium carrying a computer program product that, when executed on computing means, provides instructions for executing any of the methods as described above. The term "carrier medium" refers to any medium that participates in providing instructions to a processor for execution. Such a medium may take many forms, including but not limited to, non-volatile media, and transmission media. Non-volatile media includes, for example, optical or magnetic disks, such as a storage device which is part of mass storage. Common forms of computer readable media include, a CD-ROM, a DVD, a flexible disk or floppy disk, a tape, a memory chip or cartridge or any other medium from which a computer can read. Various forms of computer readable media may be involved in carrying one or more sequences of one or more instructions to a processor for execution. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fibre optics, including the wires that comprise a bus within a computer.

Further by way of illustration, some features and advantages of embodiments of the present invention are illustrated, by comparing the transient radar method with a Nicolson-Ross-Weir retrieval method. The Nicolson-Ross-Weir (NRW) retrieval method is based on the inversion of the Fresnel-Airy formulas expressing the normal reflection and transmission coefficients of a material layer through the wave impedance of the medium and its refraction index. Through the wave impedance and the refraction index, one can find the medium permittivity and permeability (for anisotropic media—tangential components of the permittivity and permeability tensors). In the following, permittivity obtained by the two methods is compared for two kinds of material which are PVC and Teflon using irradiation at a frequency near 10 GHz respectively.

Returning first to the NRW method for calculating permittivity:

Using the NRW method, if one has the S parameter S11 and also the S parameter S21 for a unique frequency, by following formulas, the permittivity for nonmagnetic materials can be achieved.

$$k = \frac{S_{11}^2 - S_{21}^2 + 1}{2S_{11}} \quad (1)$$

$$\Gamma = k \pm \sqrt{k^2 - 1} \quad (2)$$

For selecting plus or minus in equation (2), one can select any $\Gamma$ which has this condition $|\Gamma| \leq 1$.

$$Z = \sqrt{\frac{\mu}{\varepsilon}} = \frac{1 - \Gamma}{1 + \Gamma} \quad (3)$$

For the samples in the present example $\mu_r = 1$ so one has $$\varepsilon_r = \left(\frac{1-\Gamma}{1+\Gamma}\right)^2 \quad (4)$$

In the following table, both results obtained by the two methods for the same materials (PVC and Teflon), are shown, as well as comparison with literature values. The results obtained by the NWR method are only for permittivity. Using the Transient radar method, calculation was done simultaneously for permittivity and thickness.

TABLE 1

Comparison between results of NRW and TRM

| Material | Frequency (GHz) | Method | permittivity | Error (%) | Thickness (mm) obtained | Thickness (mm) Real | Error (%) | Time (ms) |
|---|---|---|---|---|---|---|---|---|
| PVC | 10.08 | Transient radar | 2.54-0.15i | 14 | 106.30 | 103.00 | 3 | 51 |
| PVC | 10.08 | NRW | 2.38-0.55i | 33 | — | 103.00 | — | 69 |
| PVC | Around 10.08 | Literature | 2.83-0.03i | reference | — | 103.00 | — | — |
| Teflon | 10.08 | Transient radar | 1.98-0.06i | 5 | 19.83 | 19.00 | 4 | 30 |
| Teflon | 10.08 | NRW | 1.95-0.4i | 23 | — | 19.00 | — | 66 |
| Teflon | Around 10.08 | Literature | 2.05-0Ii | reference | — | 19.00 | — | — |

The results illustrate that an accurate determination of geometric and electromagnetic properties can be obtained using the transient radar method according to an embodiment of the present invention.

Furthermore by way of example, some practical results for the transient radar method for a three layer structure and for a single layer structure are discussed below.

Figure 6:
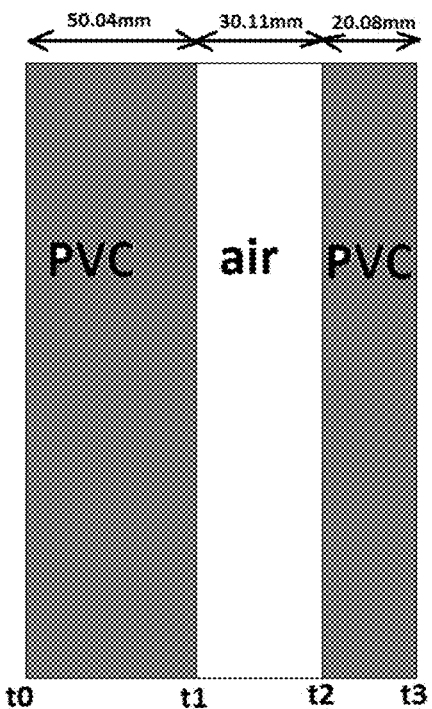
FIG. 6 illustrates a cross section of a three layer structure as studied using a method according to an embodiment of the present invention.

In one particular example, the transient radar method is applied to a three layer structure. Geometrical parameters as well as the relative complex permittivity are obtained for the three layer structure as shown in FIG. 6, using a single frequency electromagnetic wave. The three layer structure studied in the present example has a first and third layer being a PVC whereas the middle layer is air.

Figure 7:
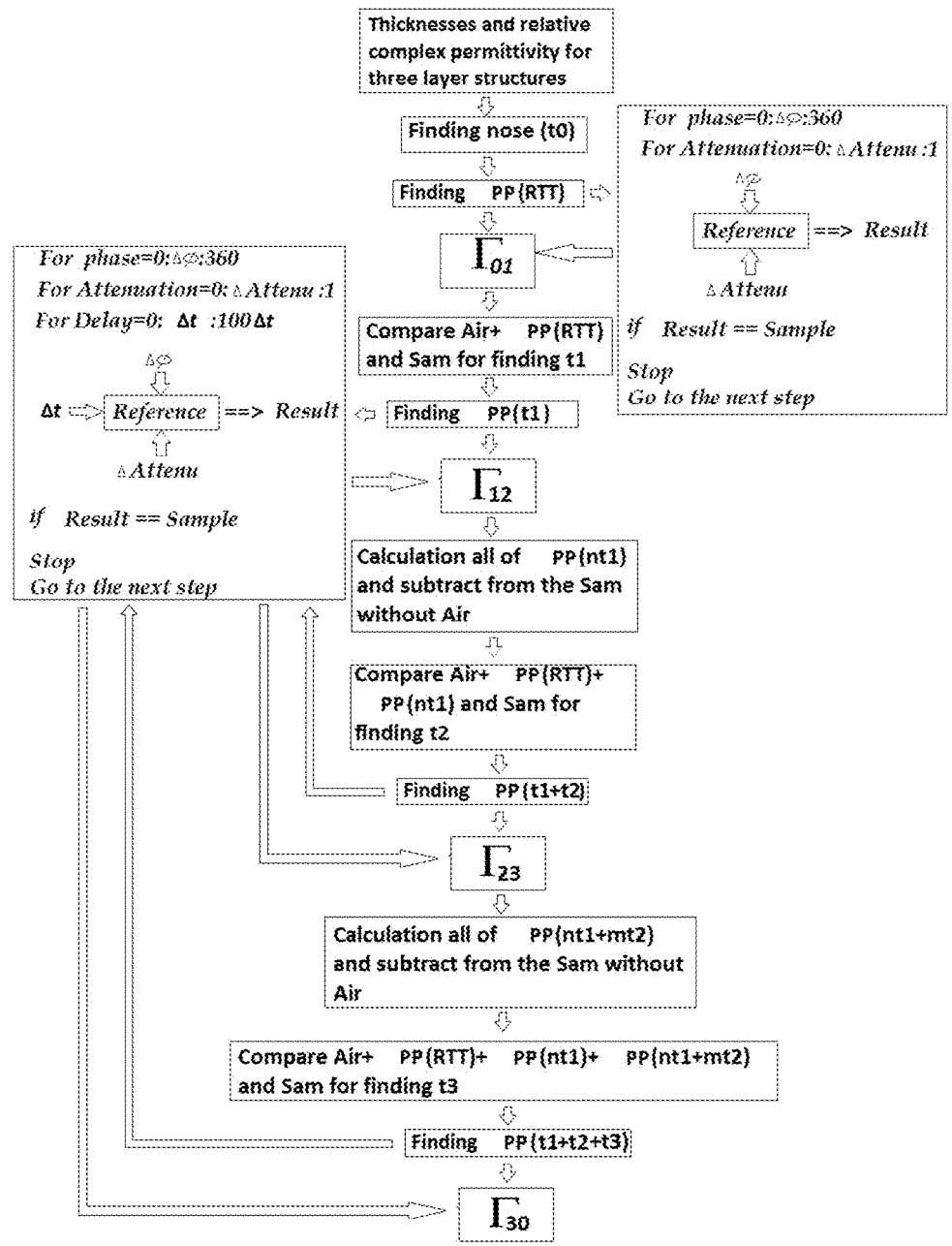
FIG. 7 illustrates an overview of the different steps of an exemplary method for determining the thicknesses and the complex permittivity for three layer structures, according to an embodiment of the present invention.

By way of illustration, the different steps that can be applied for finding a solution for the three layer structure are described below. An overview of the different steps applied in the method are shown in FIG. 7.

Optionally a calibration procedure may be applied.

Figure 19:
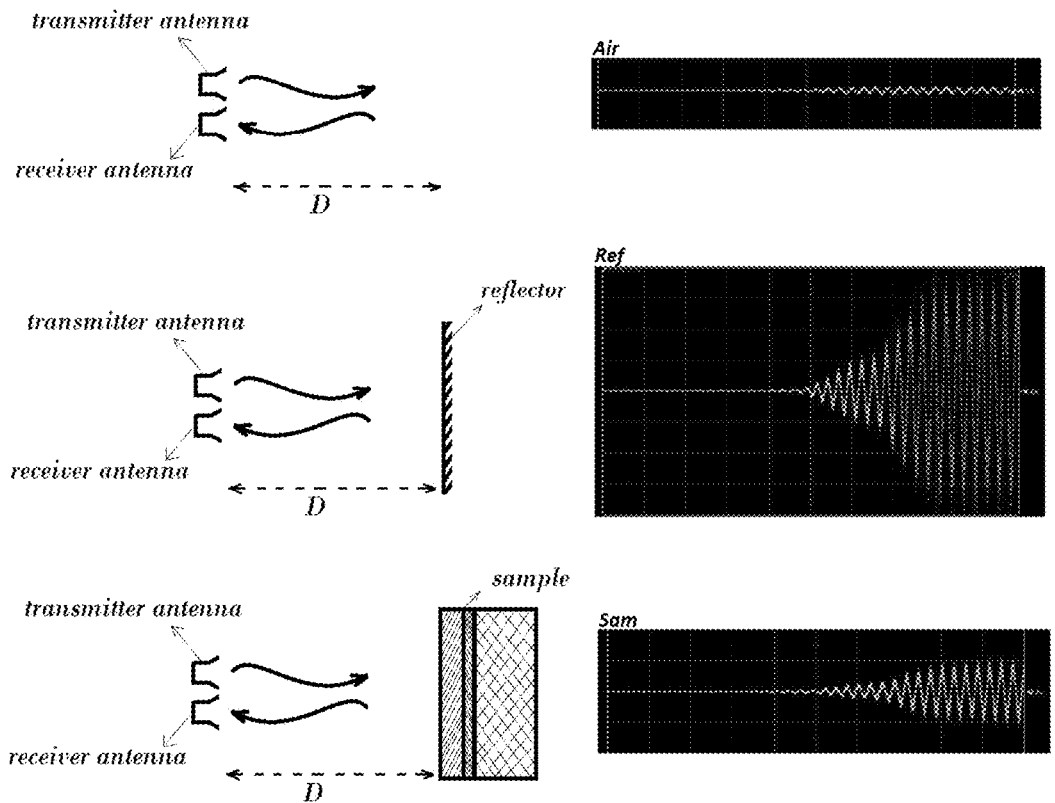
FIG. 19 illustrates the 2-step calibration procedure before the measurements on the Sample under Test (SUT) are executed. Step one comprises the cross-talk measurements between the antennas when no object is illuminated. Step two comprises the measurement of a perfect reflector. The scales on the figures are as follows: On the y-axis: 17 mV/div and on the x-axis: 300 ps/div. respectively.
Figure 20:
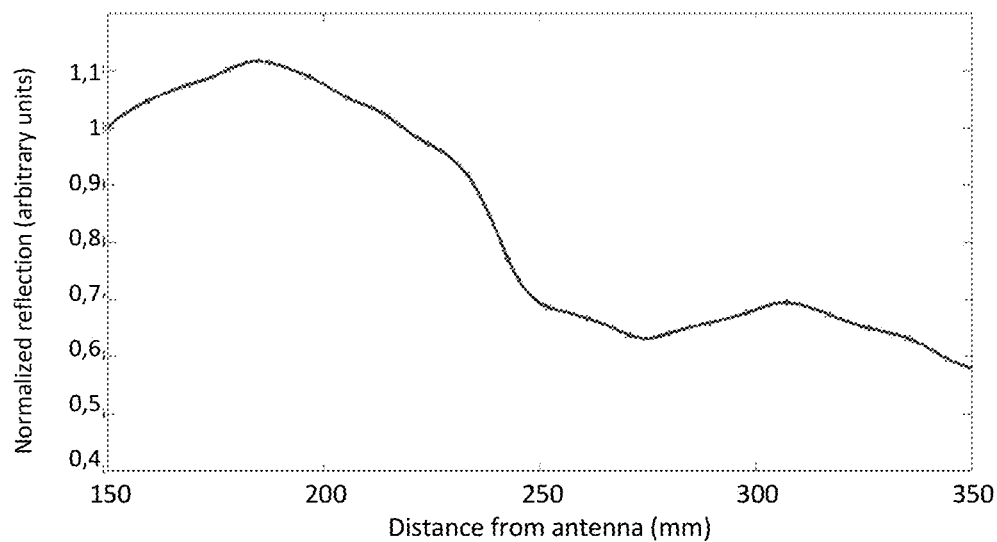
FIG. 20 illustrates an exemplary graph of the distance dependent reflection coefficient of the perfect metallic calibration mirror.

In a first calibration step illustrated in FIG. 19, the signals of empty space or air (FIG. 19a) and a metallic calibration reflector (FIG. 19b) positioned at exactly the same position as the sample under test are measured. The calibration procedure, as illustrated in FIG. 19, comprises the following steps. At first the cross-talk between emitter and receiver was determined by measuring the signal when the SUT was removed, meaning that the signal is sent into the air to infinity (FIG. 19a). This signal is coined the AIR signal. In the second step of the calibration, the SUT is replaced by a perfect metal reflector (FIG. 19b) having exactly the cross-sectional dimensions of the SUT. The front surfaces of the calibration mirror and SUT should perfectly coincide such that the round-trip times are identical (referring to the phase of the reflection signals) and the amplitude of reflection signal on the calibration mirrors is representative for all non-idealities (beam divergence, beam angle, scattering at SUT edges, . . . ).This signal is coined the REF signal. Finally the signal collected from the SUT (FIG. 19c) is coined the SAM signal. With the calibration steps explained above, one can exactly deduce the reflection coefficient at the front facet of the MLS. However, to deduce the correct value of all the consecutive reflection coefficients at all interfaces the EM wave will hit, it is also needed to know exactly how the amplitude of the electric field or power of the EM wave changes along its propagation path through the multi-layer structure. Hereto one can experimentally determine the measured reflection coefficient of the perfect metal reflector at various positions along the propagation path which can be situated in the near-field as well as in the far field. Ideally the total displacement of the calibration mirror should be 3 to 4 times the total thickness of the SUT. By means of this tabulated database of distance dependent reflection coefficient of the calibration mirror, one can drastically improve the accuracy of the system and the method.

All these three signals have been smoothed as illustrated in FIG. 17.

In a second step, the three signals ("AIR", "REF", "SAM") after being smoothed are brought together as illustrated in in FIG. 17. By correlating them, one extracts the initial point in the reflected signal representative of the moment where the irradiation beam hits the front side of the reflecting material, also referred to as the nose of the signal. We start to subtract points of Ref and Air from each other from the left to the right side.

Figure 8:
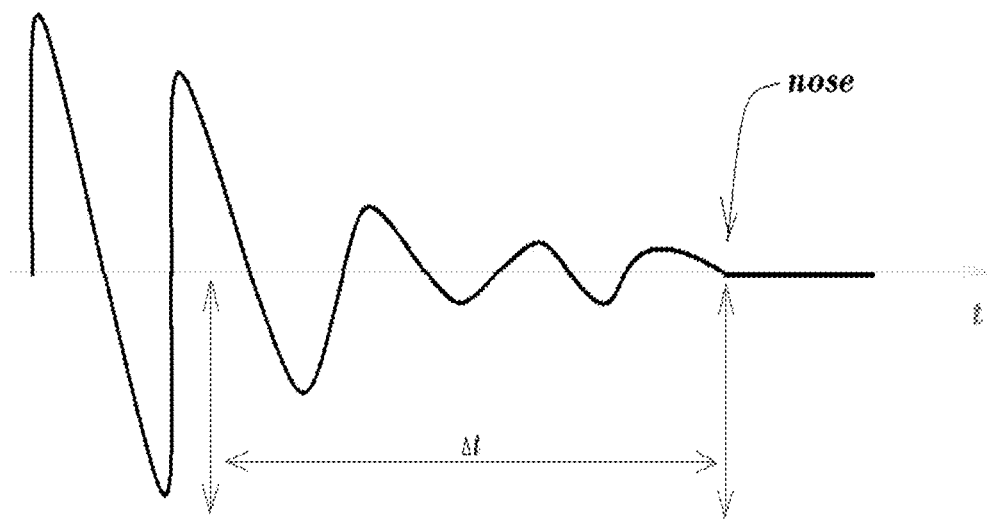
FIG. 8 illustrates identification of the nose of the signal being the initial signal that is detected by the receiver, as can be used in an embodiment according to the present invention.
Figure 9:
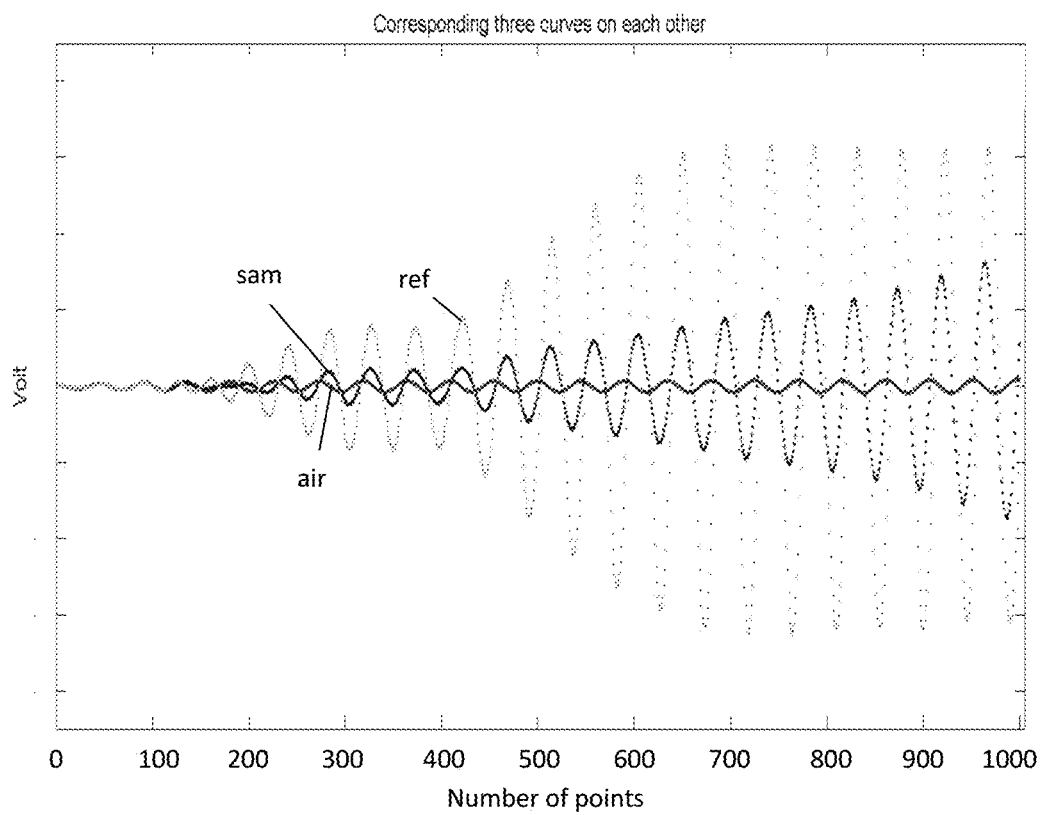
FIG. 9 illustrates comparison different components derived from the reflected continuous wave electromagnetic radiation and identifies a point in time where the different components show a different behaviour, identifying a relevant point in time at which an additional reflection contribution occurs, as can be used in embodiments according to the present invention.

The corresponding moment in time is referred to as to. The nose is illustrated in FIG. 8. The correlation of the different signals is shown in FIG. 9. From this correlation, a point is traced where "Ref" and "air" start to deviate from each other.

In step 3, the leakage between the "air" signal is subtracted from the "ref" signal and the "sam" signal, thus obtaining the following signals:

"Ref_without_air"="ref"-"air"

"Sam_without_air"="sam"-"air"

Figures 10, 11:
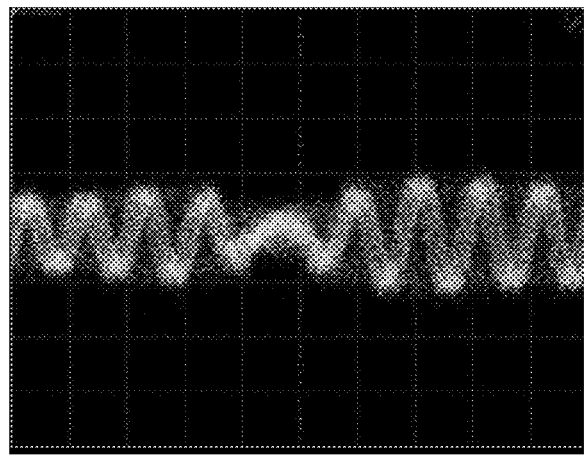
FIG. 10 illustrates a phase jump as can be taking into account when applying a method according to an embodiment of the present invention.
FIG. 11 illustrates a schematic representation of an exemplary method for taking into account phase change and attenuation for the reflected signal for finding a best match between different signals used in the processing according to an embodiment of the present invention.

The signals "ref_without_air" and "sam_without_air" can correspond exactly with each other from a certain moment in time (the nose) provided a phase and attenuation correction are applied to the "Ref_without_air" signal. The signal corrected for phase and attenuation is referred to as PP(RTT) U(t). In this signal U(t) corresponds to the unit step or Heaviside Function illustrating some delay to for a Propagation Path (PP). It is to be noticed that phase jumping can be observed directly near the nose. Phase jumping will occur several times but only the first phase jump can be observed directly. The latter is illustrated in FIG. 10. FIG. 11 illustrates the algorithm used for applying phase and attenuation correction used for finding the best match between "Ref_without_air" and "Sam_without_air" from the nose onwards.

Figure 12:
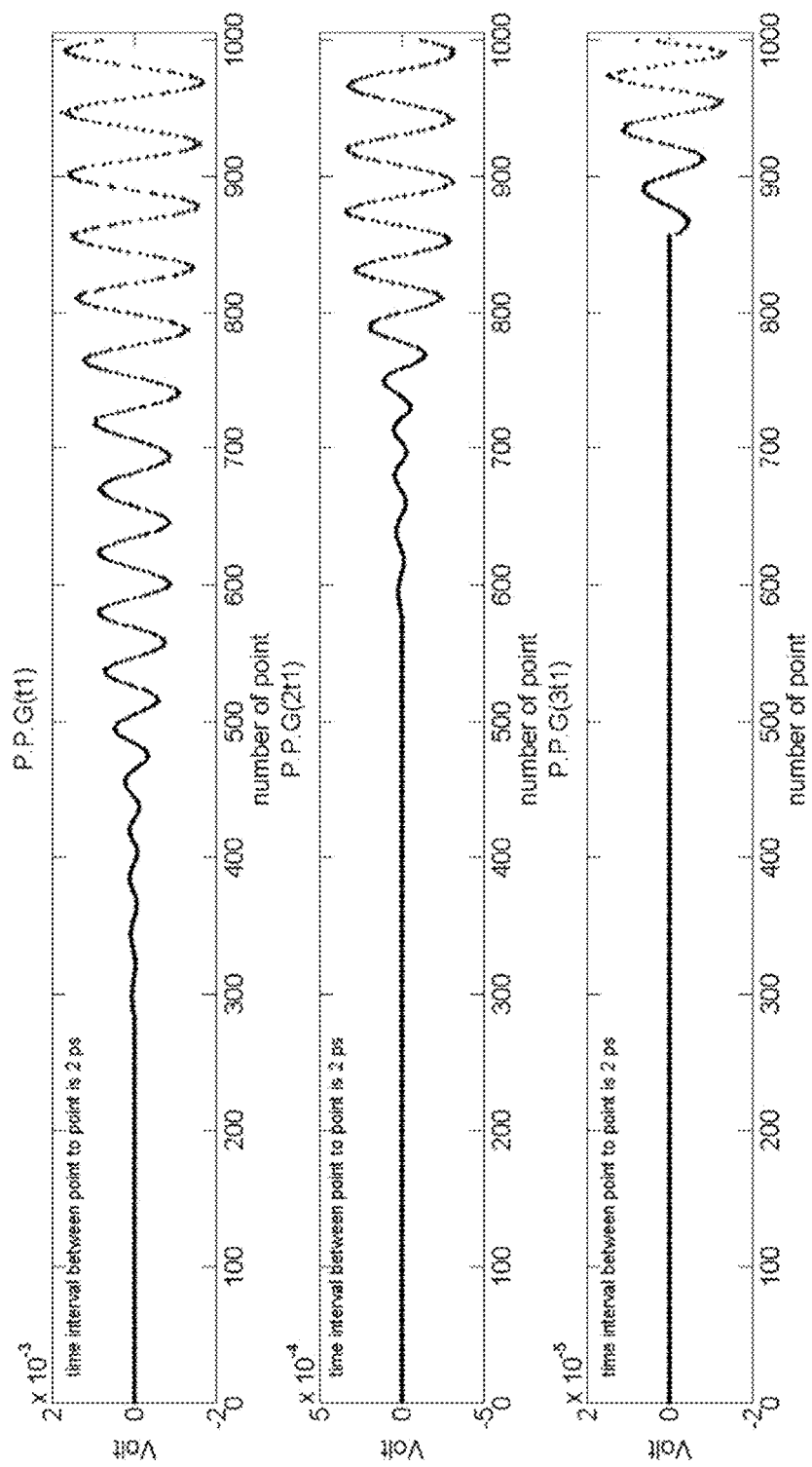
FIG. 12 illustrates different signals used in the processing for deriving a further moment in time representative of an additional reflection contribution, as used in a method according to an embodiment of the present invention.

In step 3, PP(RTT) was found. In step 4, $\Gamma_{01}$ can be calculated immediately. Further, the signal Air and PP(RTT) can be combined with each other, and a new common point can be found where the signals Sam and Air+PP(RTT) start to be separated from each other. Detecting this point provides us the time delay between PP(RTT) and also PP ($t_1$), which is referred to as $t_1$. The processing of the signals is shown in FIG. 12. In the first section (upper), the Sam signal is shown without subtracting any PP, in the second section (middle), one can see the PP(RTT) signal that was yield by applying some phase and attenuation to the Ref signal and in the final section (below) subtraction of PP(RTT) signal from the Sam signal can be seen. The start of the signal can be seen at point number 93 and the return of the signal can be seen around point number 350.

In step 5, $PP(t_1)U(t-t_1)$ is determined. After finding $PP(t_1)U(t-3t_1)$ and using $\Gamma_{01}$ and $t_1$, one can achieve the further traveling signals in the first layer, which are given by $$PP(nt_1) = \left(\frac{\Gamma_{10}}{T_{01}T_{10}}\right)^{n-1} \times (PP(t_1))^n U(t-nt_1)$$

Furthermore $\Gamma_{12}$ can also be determined.

With all of $PP(t_1)U(t-t_1)$, $PP(2t_1)U(t-2t_1)$, $PP(3t_1)U(t-3t_1)$, . . . detected, a further correlation can be performed between the signal Sam and the signal $$\sum_{n \in N} PP(nt_1)U(t-nt_1) + PP(RTT)U(t) + \text{Air}.$$

Figure 13:
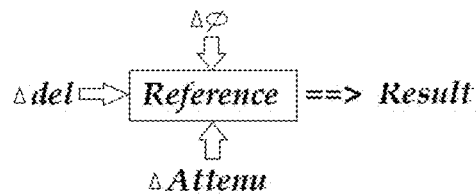
FIG. 13 illustrates a schematic representation of an exemplary method for taking into account delay, phase and attenuation in the processing according to an embodiment of the present invention.

Based on this correlation, a further point $t_2$ can be found $t_2$ corresponds with the new point where the above mentioned curves start to be separated from each other. It is to be noticed that the signal should again be corrected for attenuation ad phase. The correction algorithm is shown in FIG. 13

The corresponding corrected signal is named $PP(t_1+t_2)U(t-(t_1+t_2))$.

After finding $PP(t_1+t_2)U(t-(t_1+t_2))$, the following point $t_3$ can be determined based on the signal Air, PP(RTT)U(t), $PP(t-nt_1)U(t-nt_1)$ and also $PP(t_1+t_2)U(t-(t_1+t_2))$, for finding $t_3$. $\Gamma_{23}$ can be calculated immediately based on $PP(t_1+t_2)U(t-(t_1+t_2))$. Furthermore, also following summations can be determined:

$$\sum_{n \in N} PP(nt_1 + t_2) n \in N, n \geq 2 \tag{5}$$

$$\sum_{n \in N} PP(t_1 + nt_2) n \in N, n \geq 2 \tag{6}$$

$$\sum_{n \in N} [PP(n(t_1 + t_2)) + PP(nt_1 + nt_2)] n \in N, n \geq 2 \tag{7}$$

$$\sum_{n \in N} \sum_{m \in N} PP(mt_1 + nt_2) n, m \in N, n, m > 2, n \neq m \tag{8}$$

Figure 14:
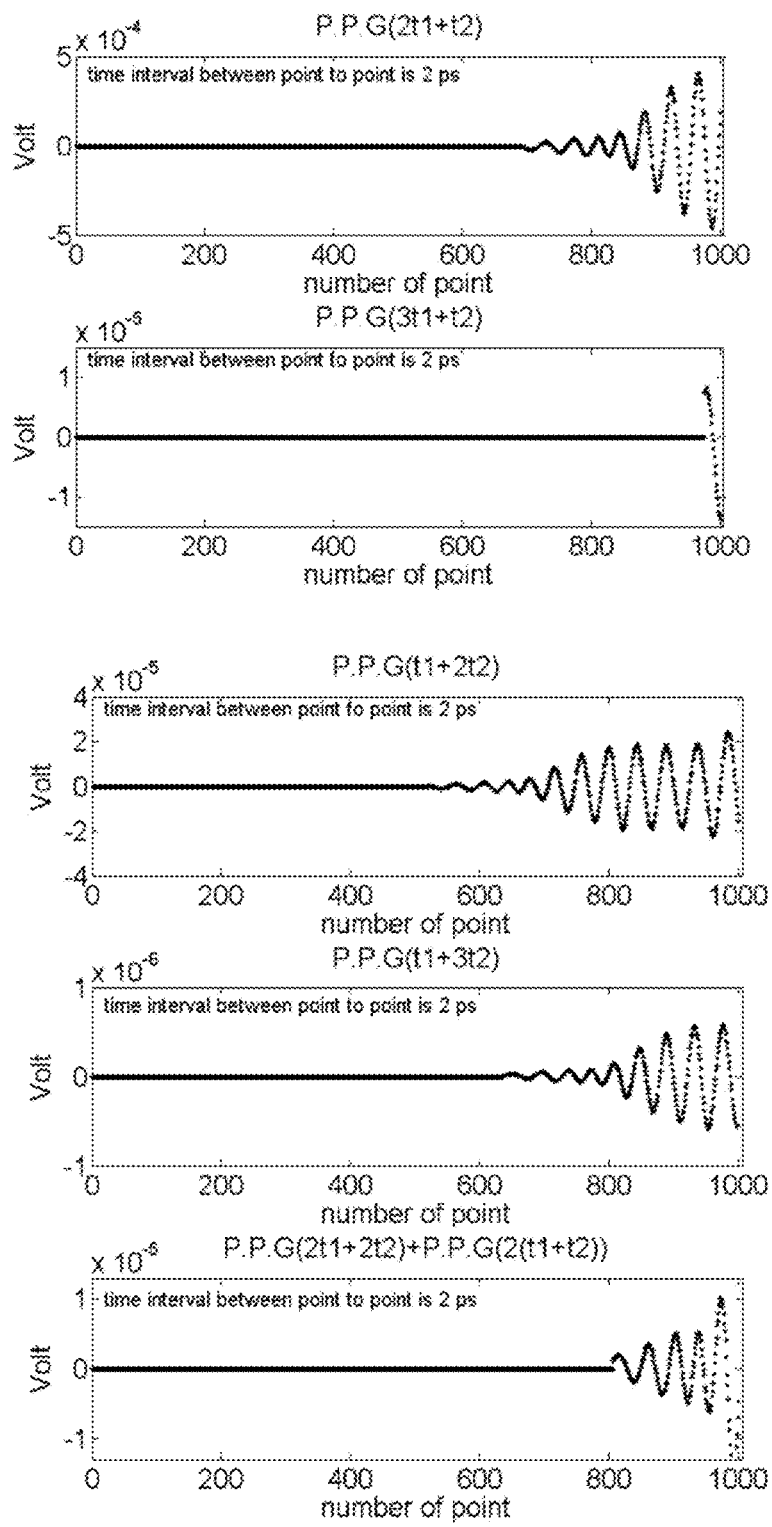
FIG. 14 illustrates a number of components in the signals used for determining relevant moments in time at which additional reflection contributions occur, as can be used in embodiments according to the present invention.

The resulting signals are shown in FIG. 14. It illustrates all of PP ($mt_1+nt_2$) located in the time.

In step 8, the thickness of the final layer is determined. Although this could be derived based on the earlier results including $t_3$ and also $\Gamma_{23}$, it is preferred to explicitly determine it, since this increases accuracy. All PP obtained in the previous step are now subtracted from the signal Sam. Then, $PP(t_1+t_2+t_3)$ is tracked. It is to be noticed that, while after finding $t_3$ in the above flowchart, the relative complex permittivity for third layer could be derived from $\Gamma_{23}$ and previous information, further calculation may be advantageous to decrease the error.

In a final step, the results for the relative permittivity and the thickness are determined based on the obtained values. In the table given below, the results as obtained with the current method are compared to the results of the real properties of the layers.

TABLE 2 obtained results for a three-layer structure

|  | First layer | Second layer | Third layer |
|---|---|---|---|
| Relative permittivity which is obtained | 2.81 − .14j | 1.13 − .04j | 2.71 − .10j |
| Relative permittivity | First layer = Third layer | 1.00 + 0.00j (air) | First layer = Third layer |
| Thickness (mm) which is obtained | 52.71 | 37.21 | 26.07 |
| Thickness (mm) | 50.04 | 30.11 | 20.08 |

Figure 15:
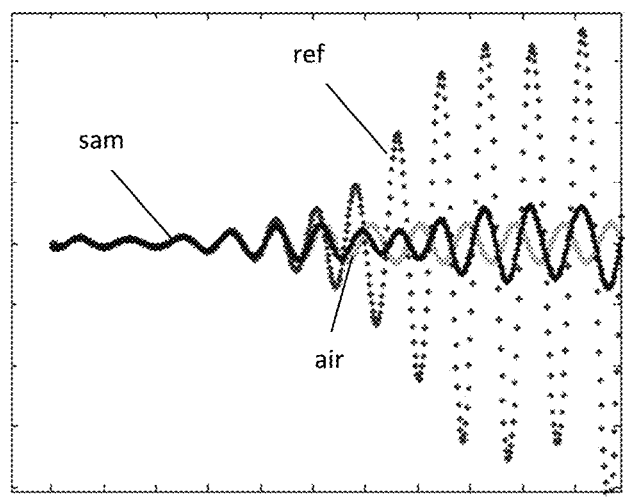
FIGS. 15 and 16 illustrate different signals used in the processing for obtaining geometric and/or EM properties of an exemplary single layer structure, illustrating features of embodiments of the present invention.

In one other particular example, the transient radar method is applied to a single layer structure. In the present example, a single thick PVE layer was monitored whereby the thickness of the layer is about 10.3 cm. Similar as for the three layer structure, first the leakage, reflector and sample signal is captured. The signals can be captured and for example visualised on an oscilloscope. After capturing a smoothing process may be applied. In this way, processing can be performed on less noisy curves. One way of smoothing can be based on a histogram technique. In a next step, the signals are correlated with each other, so the nose of the signal can be identified. The latter is illustrated in FIG. 15, showing a part of the correlated signals.

After correlating and identifying the nose (which could be referred to as to), the air leakage is subtracted from the sample signal and the reference signal. This further allows to accurately see the nose.

Figure 16:
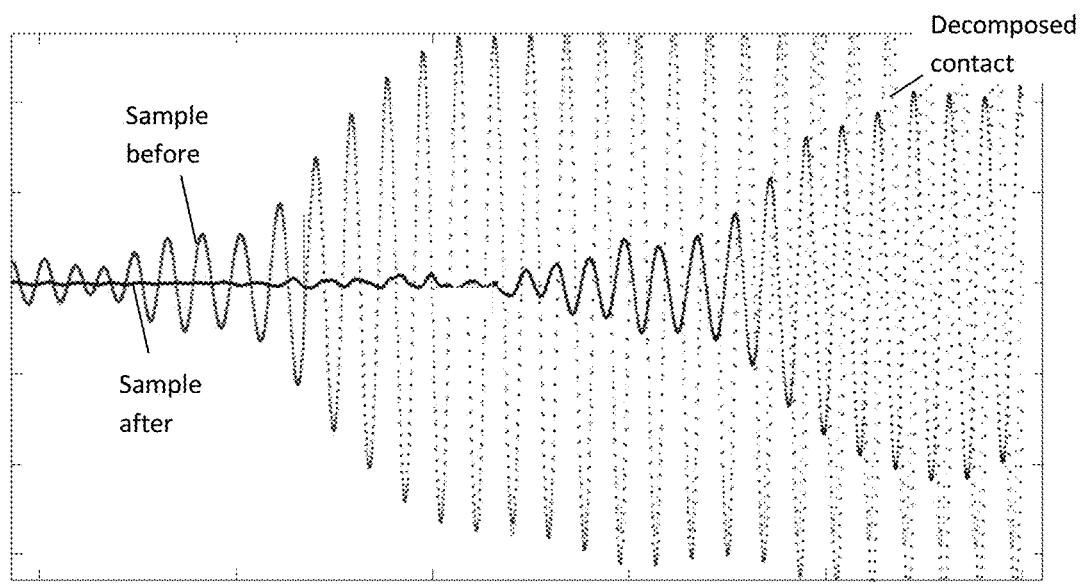

The signal corrected for air leakage, also referred to as PP, is then subtracted from the sample signal. Further, the signal Air and PP can be combined with each other, and a new common point can be find where the signals Sam and Air+PP(RTT) start to be separated from each other, i.e. the point where the deviation starts occurring. Detecting this point provides us the time delay between PP and also $PP(t_1)$, which is referred to as $t_1$. The processing of the signals is shown in FIG. 16. The identification of $t_1$ also becomes clear when the signal $PP(t_1)$ is subtracted from the sample signal. The below table illustrates the delay in the signal and the corresponding phase and absolute coefficient of reflection, from which the film properties can be derived.

TABLE 3 processed results for data obtained for a single layer

| Delay (point to point = 4e−12 S) | Absolute of reflection coefficient | Phase (rad) |
|---|---|---|
| 0 | 0.23 | 0.0628 |
| 282 | 0.129 | 0.9425 |

The resulting physical parameter, i.e. the thickness of the layer, can be derived therefrom and is illustrated in the table below, compared with the actual thickness of the layer.

TABLE 4 geometric and EM properties derived for a single layer

|  | Thickness (mm) (first layer) | Permittivity ($\varepsilon_r$) |
|---|---|---|
| Valid data | 103 | 2.88 ± 0.06 − 0.11i ± 0.06i |
| Achieved data | 106.3 | 2.54 − 0.15i |

The examples illustrate that the transient radar method advantageously provides accurate information regarding the geometric and electromagnetic parameters of layers in a layer-based structure.

TABLE 5 geometric and EM properties derived for a single layer.

| Single layer | PVC | PVC | PVC | PVC | PVC | Vubonite | Vubonite | Vubonite |
|---|---|---|---|---|---|---|---|---|
| Real Thickness (mm) | 102.83 ± .02 | 50.48 ± .03 | 20.10 ± .02 | 9.83 ± .03 | 3.11 ± .03 | 5.84 ± .03 | 2.89 ± .02 | 2.37 ± .02 |
| Number of measurements | 5 | 4 | 6 | 6 | 8 | 8 | 8 | 8 |
| Complex permittivity ($\varepsilon' - j\varepsilon''$) | 2.92 − 0.11j | 2.91 − 0.09j | 2.90 − 0.13j | 2.88 − 0.11j | 2.94 − 0.07j | 2.92 − 1.98j | 2.90 − 2.03j | 2.93 − 2.07j |
| Thickness before modification (mm) | 106.04 | 52.70 | 22.01 | 10.17 | 3.51 | 6.14 | 3.81 | 3.07 |
| Thickness after modification (mm) | 102.26 | 50.64 | 21.15 | 9.77 | 3.37 | 5.92 | 3.67 | 2.96 |
| Standard deviation for thickness | 0.32 | 0.17 | 0.26 | 0.27 | 0.29 | 0.16 | 0.21 | 0.29 |

TABLE 5-continued geometric and EM properties derived for a single layer.

| Single layer | PVC | PVC | PVC | PVC | PVC | Vubonite | Vubonite | Vubonite |
|---|---|---|---|---|---|---|---|---|
| Standard deviation for complex permittivity $$\sigma \sqrt{\frac{1}{N}\left[\sum_N \frac{(|\varepsilon'|-|\varepsilon'_{average}|)+}{(|\varepsilon''|-|\varepsilon''_{average}|)}\right]^2}$$ | .08 | 0.11 | 0.13 | 0.08 | 0.15 | 0.11 | 0.09 | 0.14 |
| Time for one measurement & calculation (S) | 73.13 | 41.10 | 27.03 | 16.06 | 7.04 | 6.03 | 5.10 | 3.17 |
| Time interval point to point (PS) | 8 | 4 | 2 | 1 | 0.3 | 0.4 | 0.1 | 0.1 |

Figure 21:
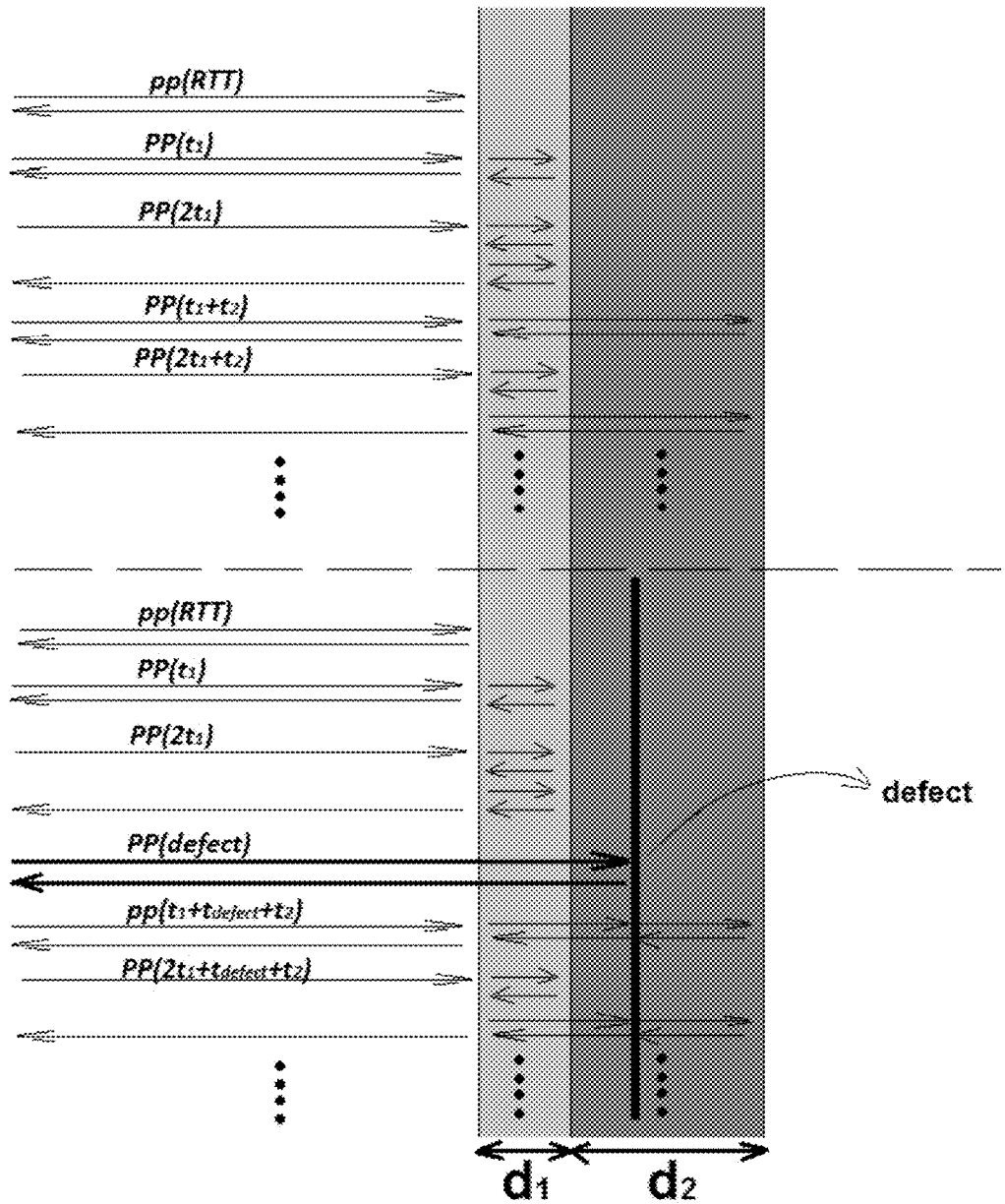
FIG. 21 illustrates an example of a defect emerging in the bottom part of the second layer of a multi-layer structure. For comparison the top layer shows the unaffected multi-layer structure.
Figure 22:
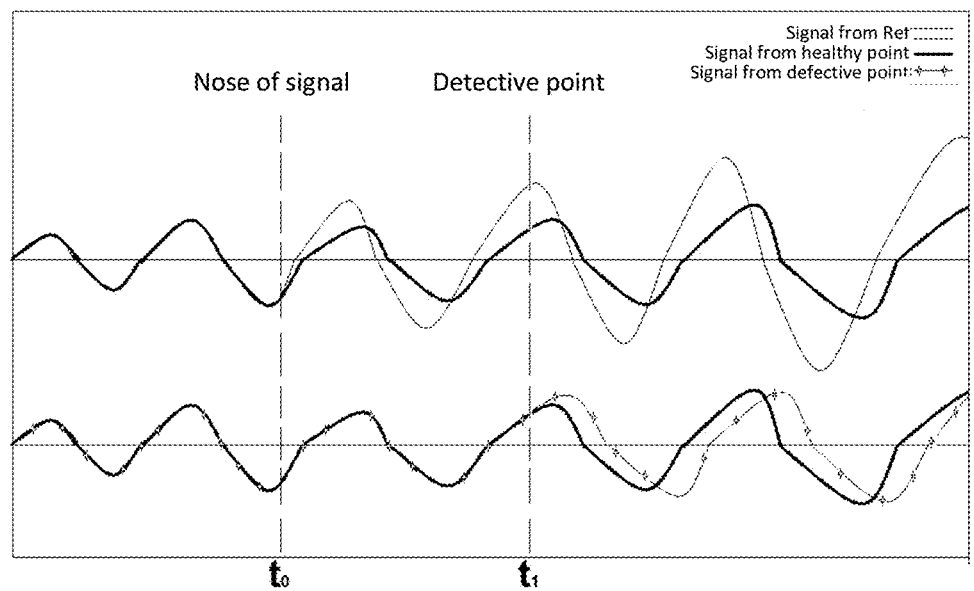
FIG. 22 illustrates an exemplary graph of transient reflection signals The top (bottom) graph shows the transient reflected waves on the ideal metal reflector and the healthy (defected) part of the multi-layer structure.

In a whole set of applications, one is not interested in the properties (thickness, permittivity and or permeability) of all the layers, but rather interested in the localization and characterization of defects in any of the layers or at any of the interface between two consecutive layers. This procedure will allow to substantially decrease up the measurement time as one is not interested in all details of the MLS. In FIG. 21 we suppose that we have a multilayer structure comprising 2 layers, each with a thickness $d_1$ and $d_2$, respectively. We assume that the top halve of the structure is defect-free, whereas the bottom halve contains a defect in the second layer. The top section shows all PPs which are reflected from the healthy region. In the bottom part, we show all PPs, including those form the first defect-less layer as well as those from the second defected layer. Now the PP from the defected region, makes an impact on the total PPs. So by tracking from the nose and comparison two curves (healthy and defective region) we can determine the characteristics of the defect, including its localization (as illustrated in FIG. 22).

Figure 23:
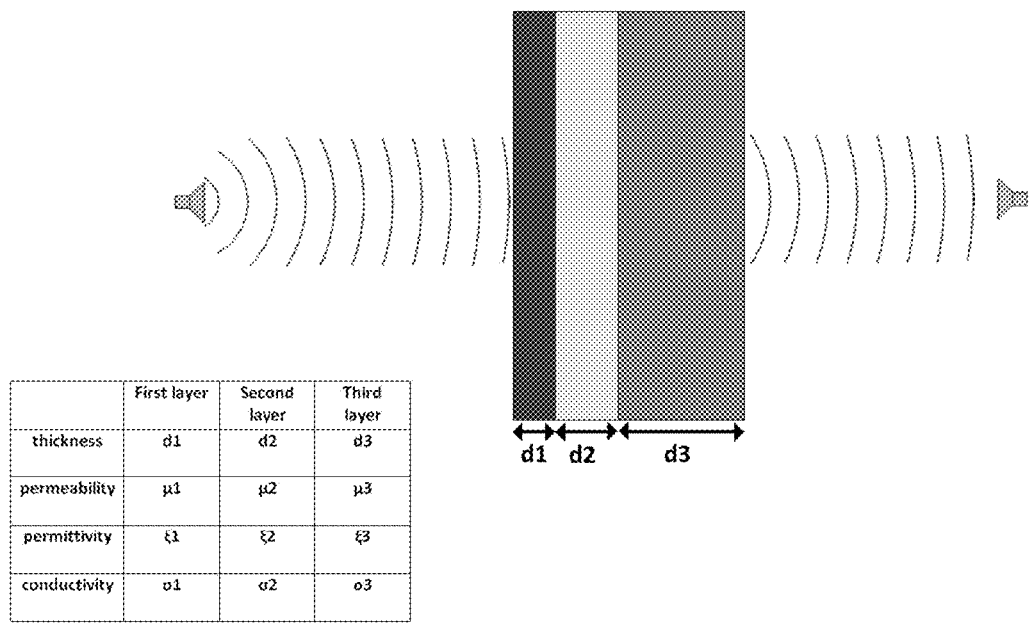
FIG. 23 illustrates a transient radar configuration operating in transmission mode, comprising an antenna for irradiating a three-layer structure from one side and a receiver antenna positioned at the other side of the three-layer structure, as can be used in an embodiment of the present invention. The characteristics of the individual layers are indicated in the table.

Finally in FIG. 23 we illustrate the setup whereby as an example a 3-layer system is analyzed in transmission mode and as such is positioned between the emitting antenna and the receiver antenna. For the 3-layer system as indicated in FIG. 1 also here one has nine unknown parameters to determine: the thickness and complex valued permittivity of each layer.

In this transmission based model at first, phase jumps must be detected which occur from the nose up to at least 3 times bigger than the total "electromagnetic" thickness of the multilayer structure.

Defining the propagation times tj in each layer of the multi-layer structure $$\sqrt{|\mu_j \varepsilon_j|} d_j = t_j \text{ for each layer } j \quad (9)$$

the propagation time to cross the distance din between the emitter and the front surface of the multi-layer structure is given by $$\sqrt{|\mu_0 \varepsilon_0|} d_{in} = t_{in} \quad (10)$$

and the propagation time to cross the distance $d_{out}$ between the back surface of the multi-layer structure and the detector is given by $$\sqrt{|\mu_0 \varepsilon_0|} d_{out} = t_{out} \quad (11)$$

Figure 24:
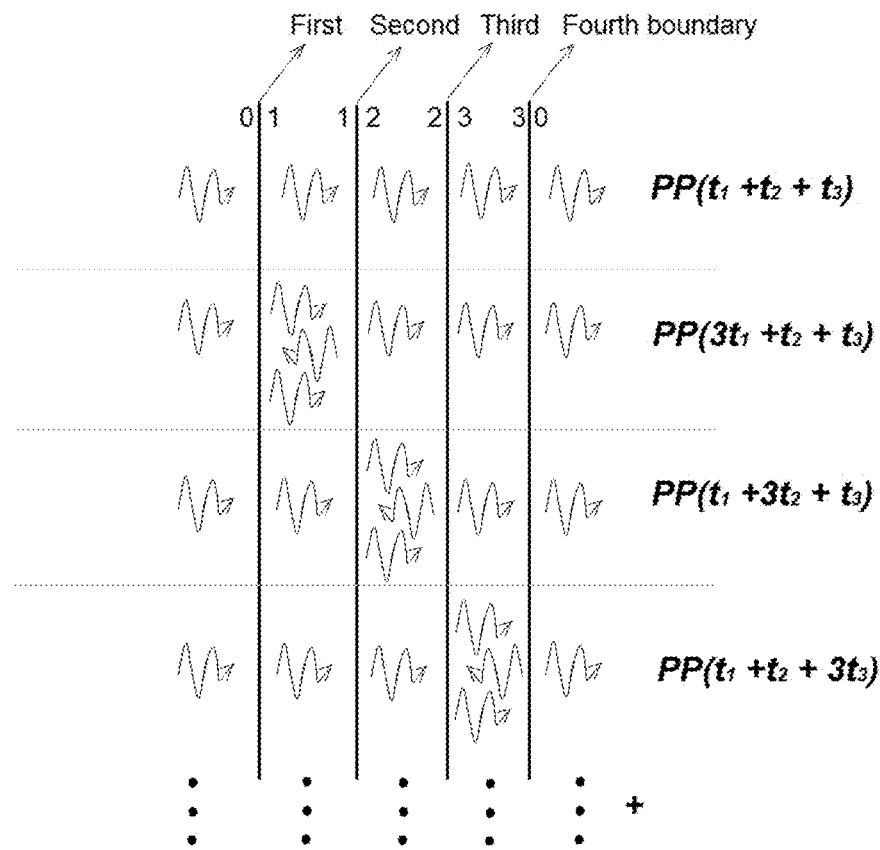
FIG. 24 provides a schematic illustration for an embodiment of the present invention whereby the transient transmission signal through a multi-layer structured, of the propagation multi-pathways of an EM wave incident on a multi-layered structure and partially bouncing forth and back between the various interfaces.

When the emitter starts to illuminate, the nose at the receiver can only be detected after the wave propagated the distance between the emitter and the front side of the multi-layer structure within a propagation time $t_{in}$, all the single propagation paths through all layers j within a single propagation time $t_j$, and from the backside of the sample till the receiver within a propagation time $t_{out}$, as illustrated by the $PP(t_1+t_2+t_3)$ at the top in FIG. 24.

Figure 25:
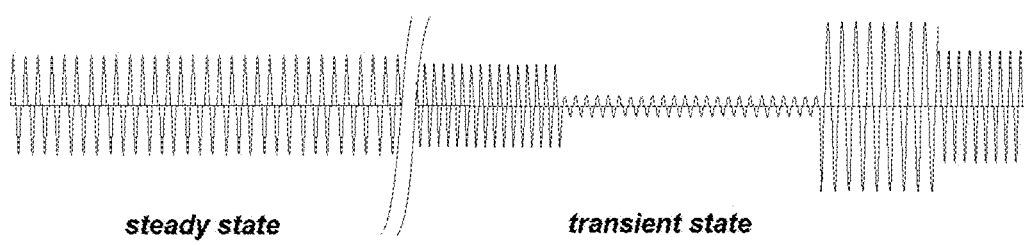
FIG. 25 provides a schematic illustration of the time evolution of the EM wave being transmitted through the various interfaces of the multi-layer structure, as used in embodiments according to the present invention.

The next signal, which will be detected and which will lead to phase jumps in the receiver signal as illustrated in FIG. 25 will be related to one of the three following PPs: $PP(3t_1+t_2+t_3)$, $PP(t_1+3t_2+t_3)$, $PP(t_1+t_2+3t_3)$. The layer with the smallest single propagation $t_j$, time will yield the first contribution. In a later stage of the transient transmission signal more complex PP will be detected such $PP((1+2m).t_1+(1+2n).t_2+(1+2p).t_3)$, whereby m,n, p∈N and so on.

In contrast to the analysis of the transient reflection signal, the properties of the layers cannot be extracted one by one in the transient transmission signal when the number of superpositions in the transient reflection signal growths. In the transient transmission signal, besides the three time scale equations, the first six PP signals needs to be combined in a set of equations to extract the different layer properties in order to be able to derive 9 equations for 9 unknown parameters of a three-layer system.

In the following a full set of equations is given whereby tij and Γij the amplitude transmission and reflection coefficient between two consecutive layers, φj is the single pass propagation factor through layer j, $\varphi = \exp(-k_0\sqrt{\varepsilon_{rj}\mu_{rj}}d_j)$.

$$PP(t_1 + t_2 + t_3) = T_{01}\varphi_1 T_{12}\varphi_2 T_{23}\varphi_3 T_{30} \quad (12)$$

$$PP(3t_1 + t_2 + t_3) = T_{01}\varphi_1^3 \Gamma_{10}\Gamma_{12}T_{12}\varphi_2 T_{23}\varphi_3 T_{30}$$

$$PP(t_1 + 3t_2 + t_3) = T_{01}\varphi_1 T_{12}\varphi_2^3 \Gamma_{21}\Gamma_{23}T_{23}\varphi_3 T_{30}$$

$$PP(t_1 + t_2 + 3t_3) = T_{01}\varphi_1 T_{12}\varphi_2 T_{23}\varphi_3^3 \Gamma_{32}T_{30}T_{30}$$

$$\frac{PP(3t_1 + t_2 + t_3)}{PP(t_1 + t_2 + t_3)} = \frac{T_{01}\varphi_1^3 \Gamma_{10}\Gamma_{12}T_{12}\varphi_2 T_{23}\varphi_3 T_{30}}{T_{01}\varphi_1 T_{12}\varphi_2 T_{23}\varphi_3 T_{30}} = \Gamma_{10}\Gamma_{12}\varphi_1^2 \quad (13)$$

$$\frac{PP(t_1 + 3t_2 + t_3)}{PP(t_1 + t_2 + t_3)} = \frac{T_{01}\varphi_1 T_{12}\varphi_2^3 \Gamma_{21}\Gamma_{23}T_{13}\varphi_3 T_{30}}{T_{01}\varphi_1 T_{12}\varphi_2 T_{23}\varphi_3 T_{30}} = \Gamma_{21}\Gamma_{23}\varphi_2^2 \quad (14)$$

$$\frac{PP(t_1 + t_2 + 3t_3)}{PP(t_1 + t_2 + t_3)} = \frac{T_{01}\varphi_1 T_{13}\varphi_2 T_{23}\varphi_3^3 \Gamma_{32}T_{30}T_{30}}{T_{01}\varphi_1 T_{12}\varphi_2 T_{23}\varphi_3 T_{30}} = \Gamma_{31}\Gamma_{30}\varphi_3^2 \quad (15)$$

$$PP(3(t_1 + t_2) + t_3) = T_{01}\varphi_1^3 \Gamma_{10}\Gamma_{12}^2 T_{21}\varphi_2^3 \Gamma_{23}T_{23}\varphi_3 T_{30}$$

$$PP(t_1 + 3(t_2 + t_3)) = T_{01}\varphi_1 T_{12}T_{23}^2 \Gamma_{21}T_{32}\varphi_2^3 \Gamma_{30}\varphi_3^3 T_{30}$$

-continued $$\frac{PP(3(t_1+t_2)+t_3)}{PP(t_1+t_2+t_3)} = \quad (16)$$

$$\frac{T_{01}\varphi_1^3\Gamma_{10}T_{12}^2T_{21}\varphi_2^3\Gamma_{23}T_{23}\varphi_3 T_{30}}{T_{01}\varphi_1 T_{12}\varphi_2 T_{23}\varphi_3 T_{30}} = \varphi_1^2\Gamma_{10}T_{12}T_{21}\varphi_2^2\Gamma_{23}$$

$$\frac{PP(t_1+3(t_2+t_3))}{PP(t_1+t_2+t_3)} = \quad (17)$$

$$\frac{T_{01}\varphi_1 T_{12}T_{23}^2 T_{21}T_{33}\varphi_2^3\Gamma_{30}\varphi_3^2 T_{30}}{T_{01}\varphi_1 T_{12}\varphi_2 T_{23}\varphi_3 T_{30}} = T_{23}\Gamma_{21}T_{32}\varphi_2^2\Gamma_{30}\varphi_3^2$$

In embodiments making use of transmission measurements, advantageously the capturing of the transient transmission signal after having detected the nose of the signal should last at least that long that the system of equations can be solved, meaning that for an N layered structure at least 3N equations can be derived, whereby N equations are related to the propagation paths in all layers, and 2N equations are related to captured phase transitions in the transient transmission signal.

By way of illustration, embodiments of the present invention not being limited thereto, a plurality of examples are shown below.

Figure 26:
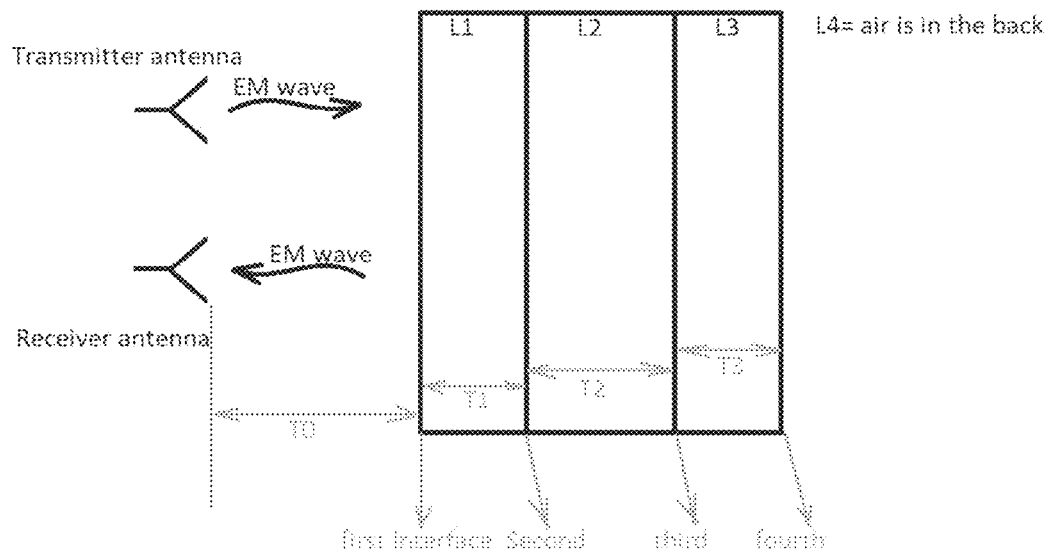
FIG. 26 to FIG. 31 illustrate examples of a structure under study according to an embodiment of the present invention.

In one example, a three-layer structure is analysed. In the present example, a structure comprises 3 layers L1, L2 and L3, however the environment before and beyond the structure can also be analyzed, meaning the thickness T0 and EM properties of the air layer before the structure and the EM properties of the environment L4 beyond the structure can also be studied. The structure studied in the present example is shown in FIG. 26. The first layer L1 can be a single material or a layer of several mixed materials with certain EM properties, whereby the EM properties are different from those of the second layer L2 and the third layer L3. The electromagnetic properties of the first, the second and the third layer are different. The different layers L1, L2 and L3 each may consist of several mixed materials. According to embodiments of the present invention, the following properties can be determined: the thickness T0 of the layer before the structure, the thickness T1, T2 and T3 of the layers L1, L2 and L3, electromagnetic properties of the layers L1, L2 and L3, as well as electromagnetic properties of the backside of the sample, which in the present example is air.

It is to be noted that electromagnetic properties of any layer, for example also for a single layer, can be dependent on the density of the material in that layer, the temperature of the material in that layer, ageing properties of the material in that layer, pressure properties of the material in the layer, curing processes of the layer, drying processes in the layer, humidity penetration in the layer, etc.

It also is to be noted that any layer can either comprise one homogeneous material but can also be composed of more components such that the electromagnetic properties of this material can be function of the composition of the material. The latter can for example be retrieved via a database, for example by using a look-up table or via a particular formula, such as a dielectric or magnetic mixing formula.

The example is applicable for a plurality of application, some of them being exemplified as follows. In some embodiments, applications are identification of properties of thin layer coatings or defects therein, e.g. for coatings with a thickness down to or defects with a size down to 10 mm, which can be identified using sampling time resolution with the TRM system/methodology.

Another example is the characterisation of thick layer structures, such as for example structures from construction industry like those comprising a front wall, a wall cavity and a back wall, which all together may have a thickness between 30 cm and 100 cm, e.g. between 50 cm and 100 cm. In FIG. 26, the layer L2 thus also may be a wall cavity as in the example of the construction industry, where the cavity is an airgap between the front construction layer L1 and back construction layer L3. When the air cavity is pure air, the EM properties of pure air will be retrieved. When the EM properties of the cavity retrieved by the TRM technique appear to be different from air, the gap might be filled with a thermal insulation material, which can be looked up in a lookup table or a database.

Figure 27:
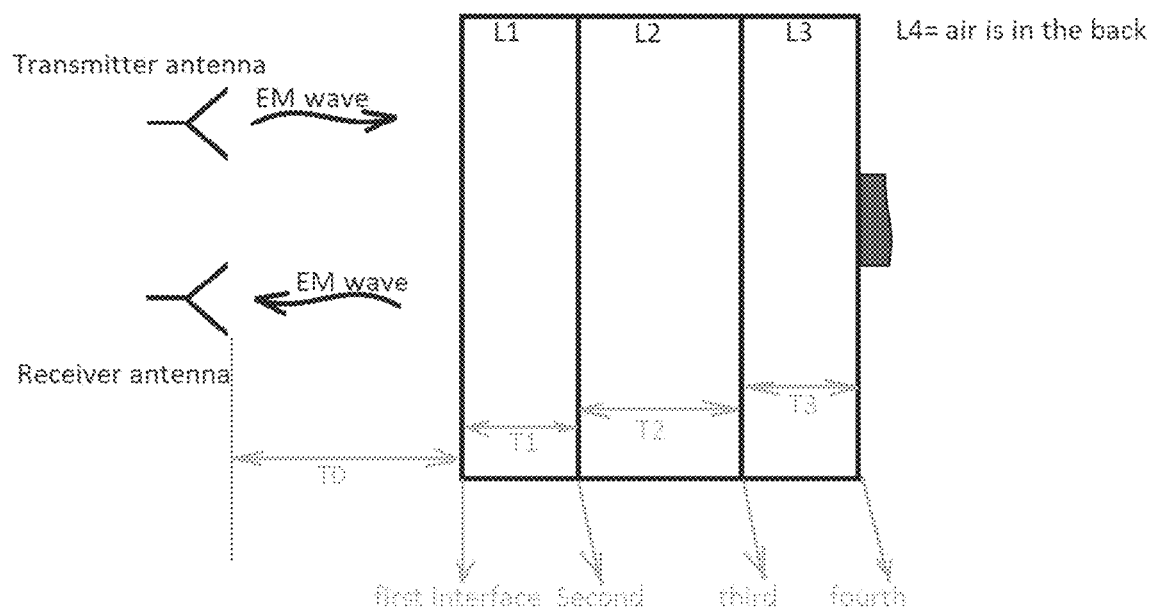

Another example of an application is the detection of defects, such as for example the presence of a patch of glue, the presence of debris, etc. which for example may be present at the backside of the structure under investigation. When the TRM method targets the identification of all layers L1, L2, L3 and L4, as illustrated in FIG. 27, one can find out that the EM properties of the backside side layer does not correspond to air, meaning that there is a defective region. The latter is illustrated in FIG. 27.

Figure 28:
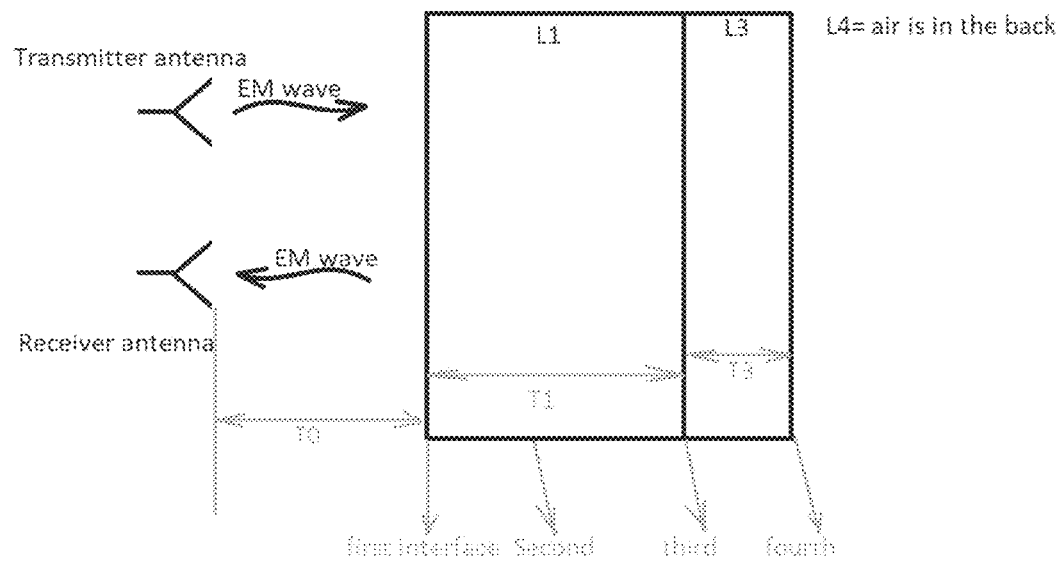

In yet another example of an application, identification of material properties can be performed for a first layer L1 consisting of several materials which are mixed to each other and having final EM properties which are similar to those of the second layer L2 with different materials. The structure is shown in FIG. 28, whereby electromagnetic properties of the first layer are equal to the electromagnetic properties of the second layer, the first layer exists of A, B and C materials and the second layer consists of E, C and D materials, whereby the materials A, B, C, D and E are different materials. TRM according to embodiments of the present invention allows for characterising the layers and the materials.

Figure 29:
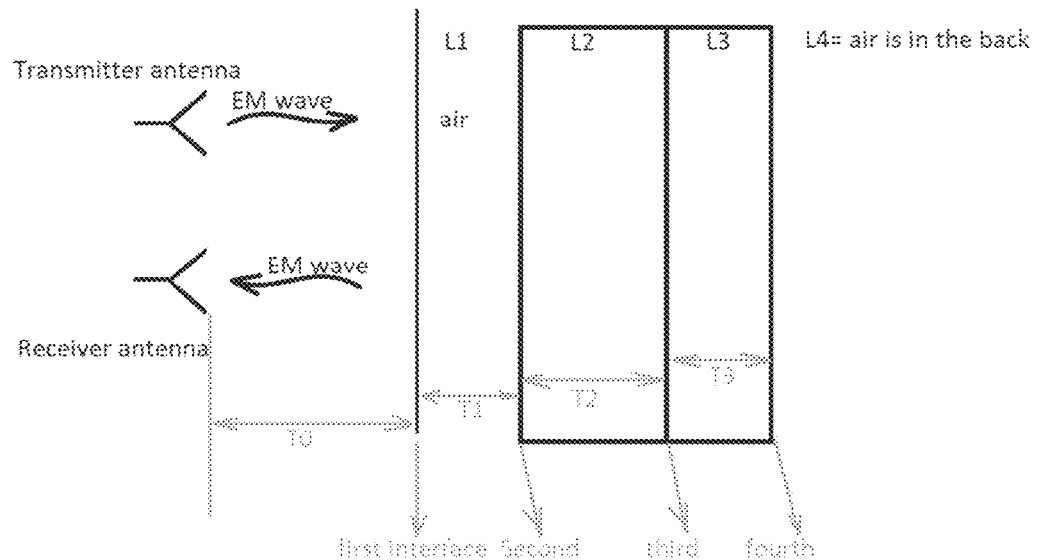

In still another example detection can be performed of the complete or partial removal of a first layer due to a defect. TRM is able to detect thicknesses T0, T1, T2, T3 of the layers, EM properties of the layers L1, L2 and L3 and additionally of the EM properties of backside of sample (here is air). E.g. in this example, the structure under investigation might be also vibrating such that the thickness of L1 might be oscillating. A corresponding structure is shown in FIG. 29

Figure 30:
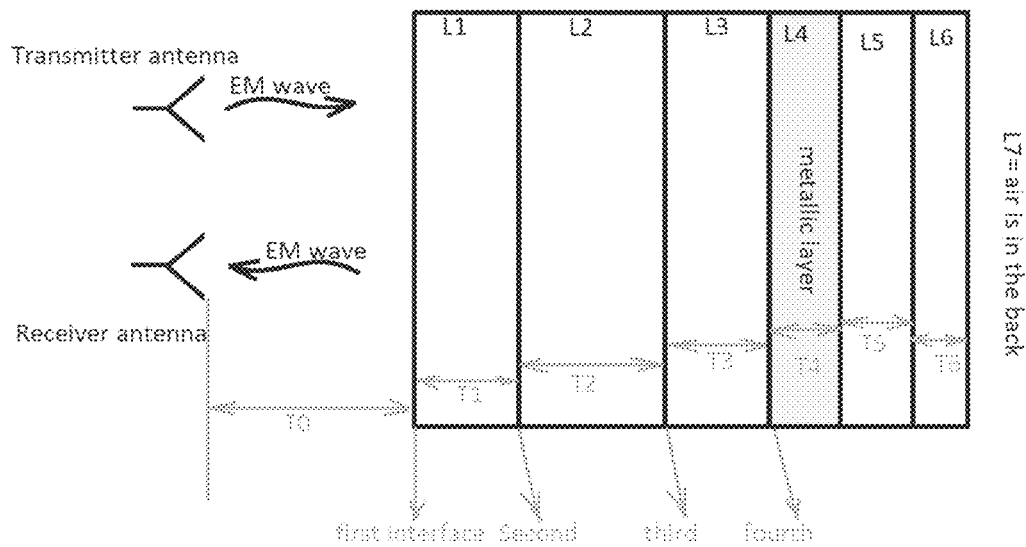

In another example, the application relates to a layer based structure which comprises a metallic layer. TRM according to embodiments of the present invention thereby is able to extract thicknesses and EM properties of layers which are located in front of the metallic layer. Properties of the layers positioned behind the metallic layer cannot be detected. Neither the thicknesses nor the electromagnetic properties of layers L4, L5 and L6 are detectable. The structure is shown in FIG. 30.

Figure 31:
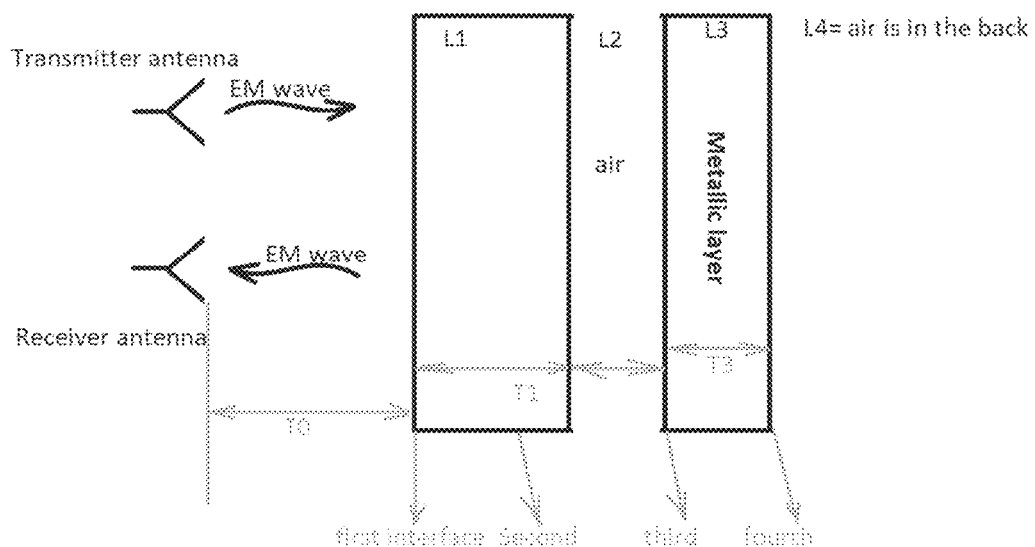

In still another example, the application is shown wherein airgap detection between a coating and a metallic sheet is performed. The example shows that TRM is able to measure the thicknesses T1, T2 of the layers 1 and 2 and the EM properties of the layers L1, L2 (air) and front side of metal but the thickness T3 of the third layer cannot be calculated. The structure is shown in FIG. 31.

In some embodiments, methods and systems are provided for optimising insulation of constructions, e.g. providing insulation materials into wall cavities. It is an advantage of embodiments of the present invention that sensor methods and systems are provided that allow monitoring directly in real-time at one or more positions the filling process of insulation material into wall cavities. It thereby is an advantage that an optimal material density can be obtained, yielding the best thermal insulation quality at the lowest material cost.

In some embodiments, methods and systems are provided for identifying structural integrity and defects in constructions, such as for example detection of concrete cracks, detection of voids in concrete, detection of delamination in concrete slabs, in bridges, in decks, detecting bond issues, detecting deterioration of concrete.

In some embodiments, methods and system are provided for monitoring textile reinforced cements. The latter may include optimisation of composite material production and the follow-up during the static and dynamic loading of composites.

The invention claimed is:

1. A method for determining characteristics of a layer-based structure comprising one or more materials, the method comprising:
   irradiating the layer-based structure repetitively with an electromagnetic wave comprising a transient part from no radiation to steady-state, such that a reflection of the electromagnetic wave at, or a transmission through, different interfaces of the layer-based structure generates a series of reflected or transmitted parts of the electromagnetic wave, the layer-based structure being sufficiently transparent to the used electromagnetic radiation, wherein irradiating with electromagnetic radiation is irradiating with a substantially monochromatic radiation of substantially one frequency;
   capturing samples of the series of reflected or transmitted parts for each irradiating electromagnetic wave, wherein capturing is done at least for times corresponding to a transient regime of the reflected or transmitted parts, wherein the transient regime is from substantially zero reflected or transmitted radiation to steady-state;
   deriving from the samples information regarding different contributions to the reflected or transmitted part of the electromagnetic wave stemming from the reflections of the electromagnetic wave at, or the transmissions through, the different interfaces of the layer-based structure; and
   determining from said information at least geometric information and/or electromagnetic properties of one or more layers of the layer-based structure.

2. The method for determining characteristics according to claim 1, wherein said deriving comprises a deconvolution of the captured reflected or transmitted part of the electromagnetic wave into different contributions to the reflected or transmitted part of the electromagnetic wave stemming from the reflections of the electromagnetic wave at, or the transmissions through, the different interfaces of the layer-based structure.

3. The method for determining characteristics according to claim 1, wherein said deriving comprises identifying different moments in time corresponding to different contributions to the reflected or transmitted part of the electromagnetic wave stemming from the reflections of the electromagnetic wave at, or the transmission through, the different interfaces of the layer-based structure.

4. The method according to claim 3, wherein said determining from said information at least geometric information and/or electromagnetic properties comprises determining from said different moments in time at least geometric information regarding the one or more materials of the layer-based structure.

5. The method according to claim 1, wherein said method furthermore comprises smoothing at least a transient regime of the captured reflected or transmitted part of the electromagnetic wave.

6. The method according to claim 1, wherein deriving from said information at least geometric information and/or electromagnetic properties comprises deriving a permittivity and/or permeability of one or more materials of the layer-based structure.

7. The method according to claim 1, wherein said irradiating comprises irradiating with electromagnetic radiation in the range 0.1 GHz to 100 THz.

8. The method according to claim 1, wherein the method comprising determining electromagnetic properties of the one or more materials of the layer-based structure, the method furthermore comprising determining based on the electromagnetic properties, one or more of a density, a temperature, a curing level or an elastic strength of the one or more materials of the layer-based structure.

9. The method according to claim 1, wherein the method comprises determining electromagnetic properties of the one or more materials of the layer-based structure, the method furthermore comprising determining based on the electromagnetic properties the presence of defects in the one or more materials of the layer-based structure.

10. The method according to claim 1, wherein the method comprises determining electromagnetic properties of the one or more materials of the layer-based structure, the method furthermore comprising determining based on the electromagnetic properties the presence of one or more cavities.

11. The method according to claim 10, wherein the method comprises determining cavities in an insulation material.

12. The method according to claim 1, wherein the method comprises determining from said information at least geometric information and/or electromagnetic properties of the one or more materials of the layer-based structure without any prior knowledge regarding the one or more materials of the layer-based structure.

13. The method according to claim 1, the method comprising characterizing a structure in one or more of construction industry, rubber industry or automotive industry.

14. A system for characterizing a layer-based structure comprising one or more materials, the system comprising:
   an irradiation source adapted for generating a repetitive electromagnetic wave comprising a transient part from no radiation to steady-state, for repetitively irradiating the layer-based structure, the electromagnetic radiation being substantially monochromatic radiation of a single frequency or a narrow range around a single frequency;
   a receiver adapted for capturing samples of a series of reflective or transmitted parts for each electromagnetic wave, said series of reflected or transmitted parts of the electromagnetic wave being generated by the irradiated electromagnetic wave upon reflection at, or transmission through, different interfaces of the layer-based structure, wherein capturing is done at least for times corresponding to a transient regime of the reflected or transmitted parts, wherein the transient regime is from substantially zero reflected or transmitted radiation to steady-state; and
   a processor programmed for deriving, from the captured sample, information regarding different contributions to the reflected or transmitted part of the electromagnetic wave stemming from the reflection of the electromagnetic wave at, or the transmission through, the different interfaces of the structure, and determining from said information at least geometric information and/or electromagnetic properties of the one or more materials of the layer-based structure.

15. The system according to claim 14, wherein said processor comprises a deconvolution means for deconvolution of the captured reflected or transmitted part of the electromagnetic wave into different contributions to the reflected or transmitted part of the electromagnetic wave stemming from the reflection of the electromagnetic wave at, or the transmission through, the different interfaces of the layer-based structure.

16. The system according to claim 14, wherein the system comprises a single shot or multi-shot sampler for capturing the samples at a frequency of at least a repetition frequency of the emitted electromagnetic wave.

17. A computer program product for, when executed on a processor, determining characteristics of a layer-based structure comprising one or more materials, the computer program product being programmed for:

receiving information on a repetitive irradiation of the layer-based structure with an electromagnetic wave comprising a transient part from no radiation to steady-state, wherein the repetitive irradiation is irradiation with a substantially monochromatic radiation of substantially one frequency;

receiving information on a series of reflected or transmitted parts of the electromagnetic wave generated by the electromagnetic wave upon reflection at or transmission through different interfaces of the layer-based structure, and captured as samples of the series of reflected or transmitted parts of the electromagnetic wave, wherein capturing is done at least for times corresponding to a transient regime of the reflected or transmitted parts, wherein the transient regime is from substantially zero reflected or transmitted radiation to steady-state;

deriving from the captured samples, information regarding different contributions to the reflected or transmitted part of the electromagnetic wave stemming from the reflections at of the electromagnetic wave or the transmissions through the different interfaces of the structure; and determining from said information at least geometric information and/or electromagnetic properties of one or more layers of the layer-based structure.

18. The computer program product according to claim 17, the computer program product being implemented as a controller.

19. The computer program product according to claim 17, the computer program product being implemented as a data carrier.

* * * * *